United States Patent
Wiseman

(10) Patent No.: US 11,822,507 B2
(45) Date of Patent: *Nov. 21, 2023

(54) DATA ACQUISITION UTILIZING SPARE DATABUS CAPACITY

(71) Applicant: General Electric Company, Schenectady, NY (US)

(72) Inventor: Matthew William Wiseman, Fairfield, OH (US)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/892,350

(22) Filed: Aug. 22, 2022

(65) Prior Publication Data
US 2022/0405230 A1   Dec. 22, 2022

Related U.S. Application Data

(63) Continuation of application No. 16/438,894, filed on Jun. 12, 2019, now Pat. No. 11,422,967.
(Continued)

(51) Int. Cl.
*G06F 13/42* (2006.01)
*H04W 4/44* (2018.01)
(Continued)

(52) U.S. Cl.
CPC ......... *G06F 13/4282* (2013.01); *G07C 5/008* (2013.01); *G07C 5/0841* (2013.01); *G08G 5/0013* (2013.01); *H04W 4/44* (2018.02)

(58) Field of Classification Search
CPC ...... G06F 13/4282; H04W 4/44; G07C 5/008; G07C 5/0841; G08G 5/0013
(Continued)

(56) References Cited

U.S. PATENT DOCUMENTS

| 7,009,996 B1* | 3/2006 | Eddy | H04L 12/403 370/462 |
| 8,386,100 B1* | 2/2013 | Lie | G08G 5/0026 340/988 |

(Continued)

FOREIGN PATENT DOCUMENTS

| EP | 2348488 A1 | 7/2011 |
| WO | WO00/72156 A2 | 11/2000 |

*Primary Examiner* — Mahmoud S Ismail
(74) *Attorney, Agent, or Firm* — Dority & Manning, P.A.

(57) ABSTRACT

Systems and methods for data acquisition utilizing spare or unused databus capacity are provided. In one example aspect, the system includes a vehicle that includes an engine and a controller. The controller generates a data file indicative of Continuous Engine Operation Data (CEOD). The data file is transmitted over a serial databus to a bus recorder. Particularly, the data file is continuously generated by the controller and stored in a buffer. The available bandwidth of a transmission frame for the serial databus is determined. A portion of the data file is retrieved from the buffer based at least in part on the determined bandwidth. The portion of the data file is divided into relatively small transmission payloads and packed into the available bandwidth of the transmission frame. This process is repeated on a continuous basis and the bus recorder records the data. The data file is then reconstituted and decoded.

20 Claims, 13 Drawing Sheets

Related U.S. Application Data

(60) Provisional application No. 62/747,228, filed on Oct. 18, 2018.

(51) Int. Cl.
*G07C 5/00* (2006.01)
*G07C 5/08* (2006.01)
*G08G 5/00* (2006.01)

(58) Field of Classification Search
USPC .............................................. 701/3
See application file for complete search history.

(56) References Cited

U.S. PATENT DOCUMENTS

| | | | |
|---|---|---|---|
| 10,713,956 B2* | 7/2020 | Miller | H04W 4/029 |
| 2003/0225492 A1* | 12/2003 | Cope | G07C 5/008 |
| | | | 701/14 |
| 2010/0042289 A1* | 2/2010 | Beacham, Jr. | H04L 67/62 |
| | | | 701/3 |
| 2011/0184607 A1 | 7/2011 | Beacham et al. | |
| 2012/0041635 A1* | 2/2012 | Johnson | G06F 11/3466 |
| | | | 701/31.4 |
| 2014/0013002 A1* | 1/2014 | Holstein | H04B 7/18508 |
| | | | 709/231 |
| 2019/0263534 A1* | 8/2019 | Da Silva Rocha | G07C 5/085 |
| 2021/0001999 A1* | 1/2021 | Massa | B64D 25/20 |
| 2021/0258384 A1* | 8/2021 | Bonnet | G08C 15/00 |

* cited by examiner

TRANSMISSION SCHEDULE 180

TRANSMISSION FRAMES 182

| SLOTS | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| 1 | 300 | 112 | 167 | 112 | 300 | 112 | 167 | 112 | 300 | 112 | 167 | 112 | 300 | 112 | 167 | 112 | 300 | 112 | 167 | 112 | 300 |
| 2 | 344 | 311 | 217 | 311 | 344 | 311 | 217 | 311 | 344 | 311 | 217 | 311 | 344 | 311 | 217 | 311 | 344 | 311 | 217 | 311 | 344 |
| 3 | 346 | 347 | 317 | 347 | 346 | 347 | 317 | 347 | 346 | 347 | 317 | 347 | 346 | 347 | 317 | 347 | 346 | 347 | 317 | 347 | 346 |
| 4 | 72 | 10 | 356 | 54 | 166 | 10 | 356 | 54 | 72 | 10 | 356 | 54 | 166 | 10 | 356 | 54 | 72 | 0 | 356 | 54 | 166 |
| 5 | 275 | 51 | 60 | 130 | 7 | 51 | 212 | 130 | 51 | 60 | 130 | 7 | 51 | 212 | 130 | 51 | 60 | 0 | 0 | 51 | 212 |
| 6 | 335 | 36 | 73 | 173 | 33 | 224 | 213 | 173 | 0 | 0 | 0 | 173 | 33 | 224 | 213 | 173 | 335 | 0 | 0 | 173 | 33 |
| 7 | 336 | 133 | 106 | 174 | 66 | 227 | 61 | 174 | 0 | 0 | 0 | 174 | 0 | 0 | 0 | 174 | 336 | 0 | 0 | 174 | 66 |
| 8 | 341 | 225 | 107 | 175 | 67 | 230 | 154 | 175 | 0 | 0 | 0 | 175 | 0 | 0 | 0 | 175 | 341 | 0 | 0 | 175 | 67 |
| 9 | 343 | 231 | 135 | 176 | 0 | 0 | 0 | 176 | 0 | 0 | 0 | 176 | 0 | 0 | 0 | 176 | 343 | 0 | 0 | 176 | 0 |
| 10 | 70 | 232 | 136 | 177 | 0 | 0 | 0 | 177 | 0 | 0 | 0 | 177 | 0 | 0 | 0 | 177 | 70 | 0 | 0 | 177 | 0 |
| 11 | 0 | 0 | 0 | 0 | 0 | 0 | 0 | 0 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 | 0 | 0 | 0 | 0 | 0 |
| 17 | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 | 0 | 0 | 0 | 0 | 0 | 0 | 0 | 0 |
| 19 | 0 | 0 | 0 | 0 | 0 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 | 0 | 0 | 0 | 0 | 0 |

TRANSMISSION SCHEDULE — 180

TRANSMISSION FRAMES — 182

SLOTS — 184

| Slot \ Frame | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| 1 | 300 | 112 | 167 | 112 | 300 | 112 | 167 | 112 | 300 | 112 | 167 | 112 | 300 | 112 | 167 | 112 | 300 | 112 | 167 | 112 | 300 |
| 2 | 344 | 311 | 217 | 311 | 344 | 311 | 217 | 311 | 344 | 311 | 217 | 311 | 344 | 311 | 217 | 311 | 344 | 311 | 217 | 311 | 344 |
| 3 | 346 | 347 | 317 | 347 | 346 | 347 | 317 | 347 | 346 | 347 | 317 | 347 | 346 | 347 | 317 | 347 | 346 | 347 | 317 | 347 | 346 |
| 4 | 72 | 10 | 356 | 54 | 166 | 10 | 356 | 54 | 72 | 10 | 356 | 54 | 166 | 10 | 356 | 54 | 72 | 10 | 356 | 54 | 166 |
| 5 | 275 | 51 | 60 | 130 | 7 | 51 | 212 | 130 | 51 | 60 | 130 | 7 | 51 | 212 | 130 | 51 | 60 | 356 | 51 | 212 | 212 |
| 6 | 335 | 36 | 73 | 173 | 33 | 244 | 213 | 173 | 0 | 0 | 0 | 173 | 33 | 224 | 213 | 173 | 335 | 0 | 0 | 51 | 33 |
| 7 | 336 | 133 | 106 | 174 | 66 | 227 | 61 | 174 | 0 | 0 | 0 | 174 | 0 | 0 | 0 | 174 | 336 | 0 | 0 | 173 | 66 |
| 8 | 341 | 225 | 107 | 175 | 67 | 230 | 154 | 175 | 0 | 0 | 0 | 175 | 0 | 0 | 0 | 175 | 341 | 0 | 0 | 174 | 67 |
| 9 | 343 | 231 | 135 | 176 | 0 | 0 | 0 | 176 | 0 | 0 | 0 | 176 | 0 | 0 | 0 | 176 | 343 | 0 | 0 | 175 | 0 |
| 10 | 70 | 232 | 136 | 177 | 0 | 0 | 0 | 177 | 0 | 0 | 0 | 177 | 0 | 0 | 0 | 177 | 70 | 0 | 0 | 177 | 0 |
| 11 | 122 | 0 | 0 | 0 | 0 | 0 | 0 | 0 | 0 | 0 | 0 | 0 | 0 | 0 | 0 | 0 | 0 | 0 | 0 | 0 | 0 |
| 12 | 122 | 0 | 0 | 0 | 0 | 0 | 0 | 0 | 0 | 0 | 0 | 0 | 0 | 0 | 0 | 0 | 0 | 0 | 0 | 0 | 0 |
| 13 | 123 | 0 | 0 | 0 | 0 | 0 | 0 | 0 | 0 | 0 | 0 | 0 | 0 | 0 | 0 | 0 | 0 | 0 | 0 | 0 | 0 |
| 14 | 123 | 0 | 0 | 0 | 0 | 0 | 0 | 0 | 0 | 0 | 0 | 0 | 0 | 0 | 0 | 0 | 0 | 0 | 0 | 0 | 0 |
| 15 | 124 | 0 | 0 | 0 | 0 | 0 | 0 | 0 | 0 | 0 | 0 | 0 | 0 | 0 | 0 | 0 | 0 | 0 | 0 | 0 | 0 |
| 16 | 125 | 0 | 0 | 0 | 0 | 0 | 0 | 0 | 0 | 0 | 0 | 0 | 0 | 0 | 0 | 0 | 0 | 0 | 0 | 0 | 0 |
| 17 | 125 | 0 | 0 | 0 | 0 | 0 | 0 | 0 | 0 | 0 | 0 | 0 | 0 | 0 | 0 | 0 | 0 | 0 | 0 | 0 | 0 |
| 18 | 125 | 0 | 0 | 0 | 0 | 0 | 0 | 0 | 0 | 0 | 0 | 0 | 0 | 0 | 0 | 0 | 0 | 0 | 0 | 0 | 0 |
| 19 | 126 | 0 | 0 | 0 | 0 | 0 | 0 | 0 | 0 | 0 | 0 | 0 | 0 | 0 | 0 | 0 | 0 | 0 | 0 | 0 | 0 |
| 20 | 127 | 0 | 0 | 0 | 0 | 0 | 0 | 0 | 0 | 0 | 0 | 0 | 0 | 0 | 0 | 0 | 0 | 0 | 0 | 0 | 0 |

DATA ACQUISITION UTILIZING SPARE DATABUS CAPACITY

CROSS REFERENCE TO RELATED APPLICATIONS

The present application is a continuation of U.S. application Ser. No. 16/438,894, filed Jun. 12, 2019, which claims the benefit of U.S. Provisional Patent Application Ser. No. 62/747,228, filed on Oct. 18, 2018, entitled "DATA ACQUISITION UTILIZING SPARE DATABUS CAPACITY." Both applications are incorporated herein by reference in their entirety.

FIELD

The subject matter of the present disclosure relates generally to data acquisition utilizing spare or unused bandwidth of a databus.

BACKGROUND

An aircraft can include one or more engines for propulsion of the aircraft. Each engine can include and/or can be in communication with one or more electronic engine controllers (EECs). The EECs can record data related to their associated engines, such as continuous engine operating data (CEOD). If the data resides on the EECs, a number of challenges can arise. For instance, the EEC may require additional or substantial memory devices to store the data, especially if the EECs are tasked with recording data for multiple flights. Further, it can be difficult for a ground station or end user to obtain and use the data. For example, accessing the EECs can be difficult and time consuming as EEC are typically mounted under the cowls of the engine. Thus, the EECs must be accessed while the aircraft is on the ground and the entire data file is typically downloaded at once, which as noted above, is time consuming and typically requires a mobile terminal.

Some aircrafts include Ethernet-based databus that communicatively couple EECs with an engine interface unit (EIU) of the aircraft. Ethernet-based databus typically have the bandwidth capacity to transmit large data files to the EIU. Therefore, engine data can be transmitted over the Ethernet databus, and thus, the engine data no longer resides on the EECs. However, many aircrafts include a serial databus, such as e.g., ARINC 429, MIL-STD-1553, etc., and not an Ethernet-based databus. Serial databus are more limited in their bandwidth capacity and consequently conventionally it has not been possible to transmit large data files (e.g., CEOD) over serial databus. Rather, such serial databus have been used conventionally to only transmit certain engine parameters to an EIU, such as fan speed, core speed, etc.

Accordingly, improved systems and methods that address one or more of the challenges noted above would be useful.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a system. The system includes a vehicle. The vehicle has a vehicle interface unit positioned onboard the vehicle, a bus recorder, and a databus. The vehicle also has a computing device positioned onboard the vehicle and communicatively coupled with the vehicle interface unit and the bus recorder via the databus. The computing device is configured to: generate a data file; store the data file in a buffer of the computing device; determine an available bandwidth of a transmission frame for the databus; retrieve a selectively-sized portion of the data file based at least in part on the available bandwidth of the transmission frame; divide the retrieved selectively-sized portion of the data file into transmission payloads; and allocate the divided transmission payloads into available slots of the transmission frame, wherein the transmission frame is transmitted over the databus and is received by the bus recorder.

In some embodiments, the transmission frame is one of a plurality of transmission frames of a transmission schedule transmitted to and received by the bus recorder over the databus. In such embodiments, for each of the plurality of transmission frames of the transmission schedule, the computing device is configured to: determine an available bandwidth of one of the plurality of transmission frames; retrieve a selectively-sized portion of the data file based at least in part on the available bandwidth for the one of the plurality of transmission frames; divide the retrieved selectively-sized portion of the data file into transmission payloads; and allocate the divided transmission payloads into available slots of the one of the plurality of transmission frames, and wherein the plurality of transmission frames of the transmission schedule are continuously transmitted over the databus and are received by the bus recorder.

In some embodiments, the vehicle further includes an onboard computing device communicatively coupled with the bus recorder. The onboard computing device is configured to: receive the plurality of transmission frames; and reconstitute the data file based at least in part on the received plurality of transmission frames.

In some embodiments, the system further includes a remote station, and wherein the vehicle further comprises a communication unit positioned onboard the vehicle and communicatively coupled with the bus recorder, the communication unit operable to transmit the plurality of transmission frames to the remote station.

In some embodiments, the remote station includes a remote computing device. The remote computing device is configured to: receive the plurality of transmission frames; and reconstitute the data file based at least in part on the received plurality of transmission frames.

In some embodiments, reconstituting the data file includes extracting the transmission payloads from each of the plurality of transmission frames and sequentially constructing the transmission payloads into a reconstituted data file.

In some embodiments, the remote computing device is further configured to: decode the reconstituted data file to render a human-readable file.

In some embodiments, each of the transmission payloads form a portion of a data word, and wherein each of the data words has a label indicating the transmission payload is associated with the data file.

In some embodiments, the label indicating the transmission payload is associated with the data file is allocable into more than one of the available slots of the transmission frame. In some embodiments, the label indicating the transmission payload is associated with the data file is allocable into successive available slots of the transmission frame.

In some embodiments, one or more of the data words include a counter payload indicating a count of the transmission frame or a transmission payload count.

In some embodiments, the vehicle is an aircraft having a cockpit and an avionics bay, and wherein the bus recorder is positioned in one of the cockpit and the avionics bay.

In some embodiments, the computing device is an electronic engine controller (EEC) and the vehicle interface unit is an engine interface unit of the vehicle.

In some embodiments, the vehicle interface unit positioned onboard the vehicle is operable to ignore the divided transmission payloads allocated into the available slots of the transmission frame.

Another example aspect of the present disclosure is directed to a method. The method includes generating, by one or more computing devices positioned onboard a vehicle, a data file. The method also includes storing, by the one or more computing devices, the data file in a storage device of the one or more computing devices. Further, the method includes determining, by the one or more computing devices, an available bandwidth of a transmission frame for a databus. Moreover, the method includes retrieving, by the one or more computing devices, a selectively-sized portion of the data file based at least in part on the available bandwidth of the transmission frame. In addition, the method includes dividing, by the one or more computing devices, the retrieved selectively-sized portion of the data file into transmission payloads. The method also includes allocating, by the one or more computing devices, the divided transmission payloads into slots of the transmission frame. Further, the method includes transmitting, over the databus, the transmission frame. In addition, the method includes receiving, at a bus recorder positioned onboard the vehicle and communicatively coupled with the one or more computing devices, the transmission frame.

In some implementations, the transmission frame of the databus comprises one or more non-available slots having one or more data words allocated therein.

In some implementations, the transmission frame is one transmission frame of a plurality of transmission frames of a transmission schedule. In such implementations, the method further includes determining, for each of the plurality of transmission frames and by the one or more computing devices, an available bandwidth of the transmission frame; retrieving a selectively-sized portion of the data file based at least in part on the available bandwidth for the transmission frame; dividing the retrieved selectively-sized portion of the data file into transmission payloads; allocating the divided transmission payloads into available slots of the transmission frame; transmitting, over the databus, the plurality of transmission frames; and receiving, at the bus recorder, the plurality of transmission frames. In some implementations, the plurality of transmission frames can be continuously transmitted over the databus. In some implementations, the plurality of transmission frames can be continuously received by the bus recorder.

In some implementations, the bus recorder is communicatively coupled with a wireless communication unit. In such implementations, the method further includes storing, by the bus recorder, the received plurality of transmission frames as bus data; and transmitting, via the wireless communication unit, the bus data to a remote station.

In some implementations, the remote station includes a remote computing device. In such implementations, the method further includes: receiving, by the remote computing device, the bus data; and reconstituting the data file based at least in part on the bus data.

Yet another example aspect of the present disclosure is directed to an aircraft. The aircraft includes an engine. The aircraft also includes one or more aircraft systems. The aircraft further includes an engine interface unit positioned onboard the vehicle and communicatively coupled with the one or more aircraft systems. Moreover, the aircraft includes a bus recorder and a serial databus. In addition, the aircraft includes an engine controller having a storage device and positioned onboard the vehicle, the engine controller communicatively coupled with the engine interface unit and the bus recorder via the serial databus. The engine controller is configured to: generate a binary data file indicative of continuous engine operating data; store the binary data file in a storage device of the engine controller; determine an available bandwidth of a transmission frame for the serial databus; retrieve a selectively-sized portion of the binary data file based at least in part on the available bandwidth of the transmission frame; divide the retrieved selectively-sized portion of the binary data file into transmission payloads; and allocate the divided transmission payloads into available slots of the transmission frame, and wherein the transmission frame is transmitted over the serial databus and is received and stored by the bus recorder.

In some embodiments, the aircraft has a cockpit and an avionics bay, and wherein the bus recorder is positioned in one of the cockpit and the avionics bay, and wherein the engine controller is mounted to the engine.

In some embodiments, the aircraft further includes a communication unit communicatively coupled with the bus recorder, the communication unit operable to transmit the plurality of transmission frames to a remote station.

In some embodiments, the remote station is operable to receive the plurality of transmission frames and has one or more remote computing devices configured to: reconstitute the binary data file based at least in part on the received plurality of transmission frames to render a reconstituted data file; and decode the reconstituted data file to render a human-readable file.

In another aspect, a method is provided. The method includes receiving, by a remote station, bus data comprised of a transmission frame transmitted over a databus to a bus recorder, the transmission frame packed with one or more transmission payloads, wherein the one or more transmission payloads are packed into the transmission frame by: generating, by one or more computing devices positioned onboard a vehicle, a data file; storing, by the one or more computing devices, the data file in a storage device of the one or more computing devices; determining, by the one or more computing devices, an available bandwidth of the transmission frame; retrieving, by the one or more computing devices, a selectively-sized portion of the data file from the storage device based at least in part on the available bandwidth; dividing, by the one or more computing devices, the retrieved selectively-sized portion of the data file into the one or more transmission payloads; allocating, by the one or more computing devices, the divided one or more transmission payloads into slots of the transmission frame.

In some implementations, the allocated transmission frame is transmitted over the databus to a bus recorder positioned onboard the vehicle.

In some implementations, the remote station is a ground station.

In some implementations, the transmission frame is one of a plurality of transmission frames of the bus data, and wherein the plurality of transmission frames are packed with one or more transmission payloads, and wherein the one or more transmission payloads are packed into each transmission frame by: generating, by the one or more computing devices positioned onboard the vehicle, the data file; storing, by the one or more computing devices, the data file in the storage device of the one or more computing devices; determining, by the one or more computing devices, an available bandwidth of the transmission frame; retrieving, by the one or more computing devices, a selectively-sized portion of the data file from the storage device based at least in part on the available bandwidth; dividing, by the one or more computing devices, the retrieved selectively-sized portion of the data file into the one or more transmission payloads; and allocating, by the one or more computing devices, the divided one or more transmission payloads into slots of the transmission frame.

In yet another aspect, a system is provided. The system includes a vehicle having one or more computing devices including a storage device, a databus, and a bus recorder. Further, the system includes a station having one or more computing devices, the one or more computing devices configured to: receive bus data comprised of a transmission frame transmitted over the databus to the bus recorder, the transmission frame packed with one or more transmission payloads, wherein the one or more computing devices of the vehicle pack the one or more transmission payloads into the transmission frame by: generating a data file; storing the data file in a storage device of the one or more computing devices of the vehicle; determining an available bandwidth of the transmission frame; retrieving a selectively-sized portion of the data file from the storage device based at least in part on the available bandwidth; dividing the retrieved selectively-sized portion of the data file into the one or more transmission payloads; and allocating the divided one or more transmission payloads into the transmission frame.

In some embodiments, the station is a remote ground station.

In some embodiments, the station is onboard the vehicle.

In some embodiments, the databus is a serial databus, such as any of the serial databus described herein.

In another aspect, a non-transitory computer readable medium is provided. The non-transitory computer readable medium comprising computer-executable instructions, which, when executed by one or more processors of an engine controller associated with an engine of an aerial vehicle, cause the one or more processors of the engine controller to: generate a data file; store the data file in a buffer of the engine controller; determine an available bandwidth of a transmission frame for a databus communicatively coupling the engine controller and a bus recorder of the aerial vehicle; retrieve a selectively-sized portion of the data file from the buffer based at least in part on the available bandwidth of the transmission frame; divide the retrieved selectively-sized portion of the data file into transmission payloads; allocate the divided transmission payloads into available slots of the transmission frame; and cause transmission of the allocated transmission frame to the bus recorder over the databus.

In some embodiments, the databus is a serial databus, such as any of the serial databus described herein.

In some embodiments, each of the transmission payloads form a portion of a data word, and wherein each of the data words has a label indicating the transmission payload is associated with the data file.

In some embodiments, the label indicating the transmission payload is associated with the data file is allocable into more than one of the available slots of the transmission frame. In some embodiments, the label indicating the transmission payload is associated with the data file is allocable into successive available slots of the transmission frame.

In some embodiments, one or more of the data words include a counter payload indicating a count of the transmission frame or a transmission payload count.

In some embodiments, the aerial vehicle has a cockpit and an avionics bay, and wherein the bus recorder is positioned in one of the cockpit and the avionics bay.

In some embodiments, the transmission frame is one of a plurality of transmission frames of a transmission schedule.

In some embodiments, the aerial vehicle further includes an onboard computing device communicatively coupled with the bus recorder. The onboard computing device is configured to: receive the plurality of transmission frames; and reconstitute the data file based at least in part on the received plurality of transmission frames.

Other example aspects of the present disclosure are directed to systems, methods, aircrafts, engines, controllers, devices, non-transitory computer-readable media for recording and communicating engine data. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 4 provides an example transmission schedule for a serial databus of data acquisition system of FIG. 2;

FIG. 7 provides another view of the transmission schedule of FIG. 4 depicting data words allocated or packed into the available slots of a transmission frame of the transmission schedule;

DETAILED DESCRIPTION

Figure 1:
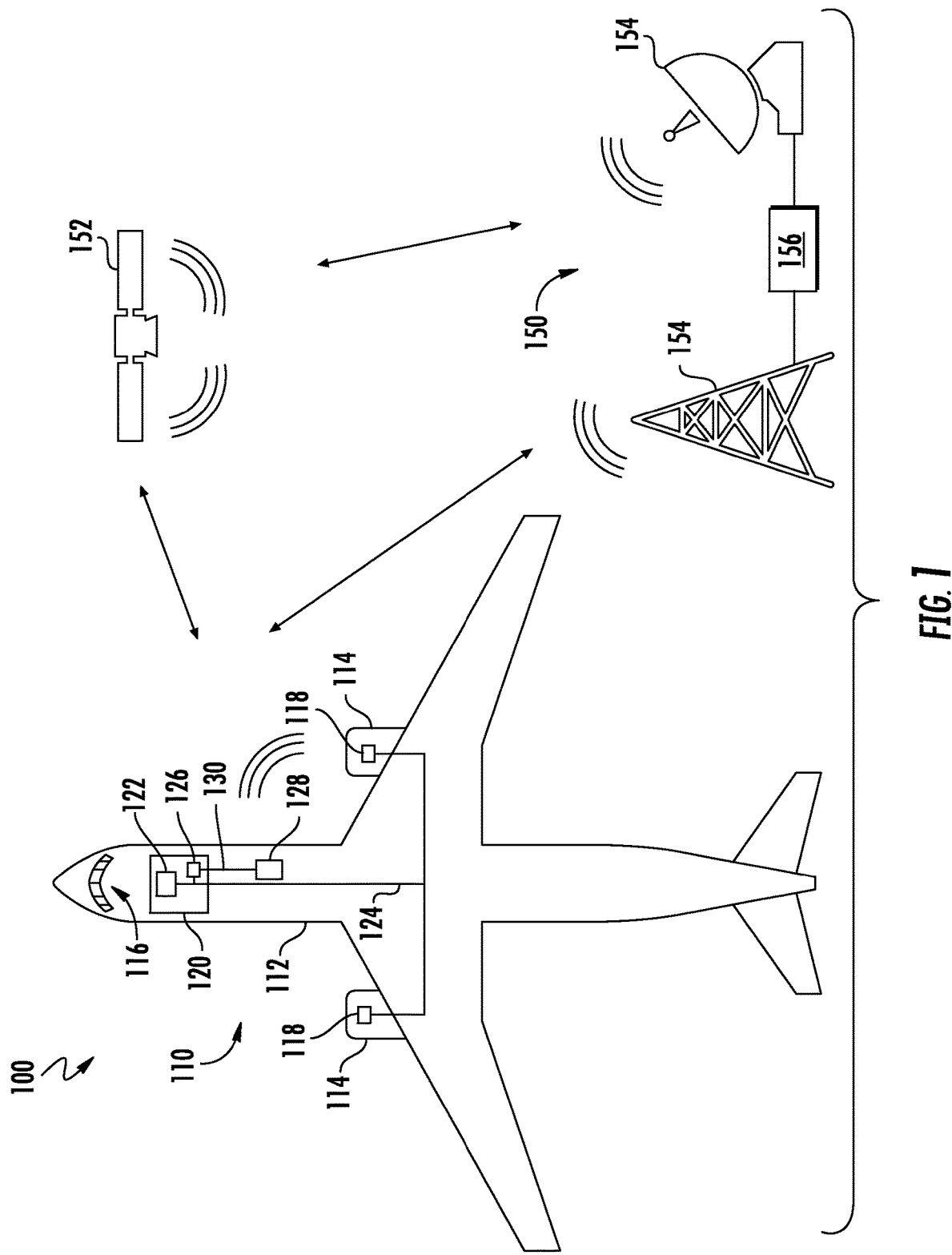
FIG. 1 provides a schematic view of an example data acquisition system according to example embodiments of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to systems, vehicles, and methods for data acquisition utilizing spare or unused bandwidth of a databus. In one example aspect, a data acquisition system is provided. The data acquisition system includes a vehicle and a remote station. The vehicle can include one or more engines and one or more computing devices or engine controllers associated with the one or more engines. The one or more engine controllers can receive sensor inputs from various sensors of the engines and can generate a binary data file indicative of continuous engine operation data (CEOD). The CEOD can be continuously generated as the engines operate. The vehicle can include a serial databus (e.g., an ARINC429 databus) over which data can be transmitted. For instance, one or more sensed, calculated, and/or predicted parameters relating to the one or more engines can be packed into a transmission frame and transmitted over the serial databus to a vehicle interface unit, such as an engine interface unit. The engine interface unit receives the parameters and routes them to various vehicle systems, e.g., for controlling the vehicle. For example, the engine interface unit can route one or more parameters to a flight management system of an aircraft.

Notably, conventionally many of the transmission frames transmitted over the serial databus have unused bandwidth. However, in accordance with example aspects of the present disclosure, the systems and methods described herein utilize the spare or available bandwidth capacity of one or more transmission frames to transmit a relatively large data file, e.g., a CEOD binary data file. Particularly, the one or more engine controllers can generate a data file. The data file can be relatively large. As the data file is generated by the engine controllers, the data file is written to or stored in a buffer of the engine controllers. The one or more engine controllers determine the available bandwidth of a particular transmission frame of a transmission schedule for the serial databus. Based at least in part on the available bandwidth determined, the one or more engine controllers retrieve or pull a selectively-sized portion of the data file from the buffer. As one example, the selectively-sized portion of the data file retrieved from the buffer can be the same size as the determined available bandwidth. As another example, the selectively-sized portion of the data file retrieved from the buffer can be a smaller size than the determined available bandwidth. Once the selectively-sized portion of the data file is retrieved from the buffer, the portion of the data file is divided into relatively small-sized transmission payloads. The transmission payloads can be loaded into a data word and a label can be assigned to the data word indicating that the data loaded into the data word is related to the data file generated by the engine controllers.

Next, the transmission payloads, or the data words in which the transmission payloads are loaded, are allocated or packed into slots of a particular transmission frame. That is, the transmission payloads are packed into slots representative of the available bandwidth capacity of that particular transmission frame. As will be appreciated, some of the slots of the transmission frame are unavailable, or used for transmitting data to the engine interface unit of the vehicle, e.g., for controlling the vehicle.

The allocated or packed transmission frame is then transmitted over the serial databus to various receiving devices, such as the engine interface unit. Additionally, in accordance with example aspects of the present disclosure, the system includes a bus recorder operable to receive and record data transmitted over the serial databus. The bus recorder can record all data transmitted over the serial databus or selective portions of the data. For instance, the bus recorder can record only data relating to the data file originating at the one or more engine controllers. One or more data fields of the data words can indicate that the data word is associated with the generated data file, as opposed to data words associated with data destined for the engine interface unit or some other receiving device.

The process of generating the data file by the one or more engine controllers and storing or writing the data file to a buffer of the one or more engine controllers can happen on a continuous or rolling basis. Likewise, a portion of the data file can be retrieved or pulled from the buffer based at least in part on the available bandwidth of a particular transmission frame, divided into transmission payloads, packed into the available bandwidth of the particular transmission frame, and transmitted over the serial databus on a continuous or rolling basis. Accordingly, a plurality of transmission frames having portions of the data file can be transmitted over the serial databus on a continuous or rolling basis. As such, for each transmission frame of a transmission schedule for the serial databus, the process of retrieving a portion of data of the data file from the buffer, dividing the portion into transmission payloads, packing the transmission payloads into the available bandwidth of a particular transmission frame, and transmitting the transmission frame over the serial databus is repeated. Collectively, the received transmission frames as well as other data recorded by the bus recorder are denoted as bus data.

In some embodiments, the data recorder can be positioned in an accessible area of the vehicle, such as e.g., the cockpit or avionics bay of an aircraft. Advantageously, by transmitting the data file to the recorder positioned in a more accessible area, the transmitted data can be accessed more easily. For instance, instead of retrieving the data from the one or more engine controllers located under the cowl of an engine, the data can be retrieved from a more accessible area, e.g., the cockpit or avionics bay of an aircraft. This can greatly speed up the data download process, for example.

In some embodiments, the data received and stored on the bus recorder can be transmitted to a remote station, such as a ground station, a naval station, an air station, a space station, some combination thereof, etc. For instance, a wireless communication unit of the vehicle can be communicatively coupled with the bus recorder. The bus data, or a collection of the plurality of frames, can be routed in whole or in part to the wireless communication unit and the wireless communication unit can wirelessly transmit the bus data to the remote station. In some alternative embodiments, the bus recorder and/or communication unit of the vehicle can include means for wired transmission of the bus data, e.g., to a remote or portable station.

Once the bus data is received by the remote station, a remote computing device of the remote station can reconstitute the data file generated by the one or more engine controllers onboard the vehicle. That is, the data file can be reconstructed. The data file can be reconstituted by the remote computing device by extracting the transmission payloads from the data words of each transmission frame and sequentially building back up or reconstructing the binary transmission payloads into a reconstituted data file. In some example embodiments, an onboard computing device of the vehicle can receive the bus data and reconstitute the data file onboard the vehicle. Further, in some example embodiments, the remote computing device of the remote station and/or the onboard computing device of the vehicle can decode the reconstituted data file. That is, one or more of the computing devices can decode the reconstituted data file to render a human-readable file. The reconstituted and decoded data file can be made available for visualization, analysis, archiving, etc.

The systems and methods according to example aspects of the present disclosure provide an ability to send large data files over a serial databus without affecting operation of current vehicle systems. For instance, in one example aspect, the systems and methods provide an ability to transmit CEOD over an ARINC429 databus in addition to the data being sent to the engine interface unit of the aircraft. Particularly, the systems and methods of the present disclosure provide a novel manner in which a large data file is divided into relatively small-bit sized transmission payloads and packed into a transmission frame having available bandwidth. The data related to the data file can be assigned labels indicating that the data in the transmission frame is related to the data file and the existing vehicle equipment can thus readily ignore such data. A bus recorder is added to the existing system to "listen in" and record data transmitted over the serial databus. The data recorded by the bus recorder can then be transmitted from the vehicle to a suitable destination, e.g., a ground station. The systems and methods according to example aspects of the present disclosure have a technical effect of transmitting data over a serial databus using available bandwidth that was previously thought to be unavailable due to lack of spare labels, legacy equipment not being able to record such data, and the variable size of such data files, e.g., the variable size of CEOD. Further, transmitting data from an originating computing device to a bus recorder can move the data to a more accessible area, e.g., from under the cowl of an engine to an avionics bay. Moreover, the computing devices generating such data files need not include extensive memory devices as the data can be transmitted to a location where memory devices are more suitably stored, e.g., in an avionics bay, cockpit, or cargo hold instead of under the cowl of an engine.

The systems and methods of the present disclosure have other suitable technical effects as well.

FIG. 1 provides a schematic view of an example data acquisition system 100 according to example embodiments of the present disclosure. As shown, the system 100 includes a vehicle, which in this embodiment is an aerial vehicle or aircraft 110. Although the aircraft 110 is depicted as a fixed-wing aircraft, in other example embodiments, the aircraft 110 can be a rotary-wing aircraft, a smaller fixed-wing aircraft, a land-air hybrid aircraft, an unmanned aerial vehicle, or some other type of aircraft. Moreover, the subject matter of the present disclosure may apply to other types of vehicles, including but not limited to land-based vehicles, amphibious vehicles, watercrafts or vehicles, spacecraft, some combination thereof, etc.

As shown in FIG. 1, the aircraft 110 includes a fuselage 112, one or more engine(s) 114, and a cockpit 116. The cockpit 116 can include a flight deck having various instruments and flight displays. The engines 114 provide propulsion of and/or on-board power generation for the aircraft 110. The engines 114 can be gas turbine engines, such as e.g., a jet turbine engine, turboprop engine, turbofan engine, a turbo shaft engine, or any other suitable engine, including piston engine propellers. A gas turbine engine can include a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

As further shown in FIG. 1, the aircraft 110 includes one or more computing devices associated with the engines 114. For this embodiment, the computing devices are electronic engine controllers 118 (EEC) equipped with Full Authority Digital Engine Control (FADEC) or a FADEC system. Each engine 114 has an associated EEC 118. The FADEC system dynamically controls the operation of each gas turbine engine 114 and requires minimal, if any, supervision from the pilot. Other control systems of the aircraft 110 can be communicatively coupled with the EECs, such as a fuel control system including one or more fuel controllers configured to control fuel flow to the one or more engines 114.

The aircraft 110 includes an avionics bay 120 that houses one or more avionics systems. Examples of avionics systems include communication systems, navigation systems, weather systems, radar systems, air traffic systems, ground proximity warning systems, etc. In some embodiments, the avionics system can include or be in communication with a location system. The location system can include a global positioning system (GPS), inertial reference systems, and the like. For this embodiment, a vehicle interface unit 122 of the aircraft 110 is positioned in the avionics bay 120. The vehicle interface unit 122, which in this embodiment is an engine interface unit, interfaces the EECs 118 with various other aircraft systems, such as e.g., flight management systems, display systems, flight control systems, digital control systems, throttle systems, inertial reference systems, flight instrument systems, auxiliary power systems, fuel monitoring systems, engine vibration monitoring systems, communications systems, flap control systems, a landing system, navigation systems, fuel control systems, as well as other systems.

The EECs 118 and the vehicle interface unit 122 are communicatively coupled or connected via a serial databus 124. The serial databus 124 can be any suitable type of serial databus. For instance, the serial databus 124 can be an ARINC429 databus, an ARINC629 databus, an RS422 databus, a MIL-STD-1553 databus, an ARINC615 databus, an ARINC708 databus, an ARINC828 databus, a CAN databus, etc. For this embodiment, the serial databus 124 is an ARINC429 databus. As will be described herein, various parameters associated with the engines 114 can be transmitted via transmission frames of a transmission schedule over the serial databus 124 from the EECs 118 to the vehicle interface unit 122, e.g., so that such information can be utilized by various systems of the aircraft 110. For example, the parameters can include fan speed, core speed, thrust level inputs, engine response to thrust level inputs, vibration, flameout, fuel consumption, ignition state, anti-ice capability, fuel filter state, fuel valve state, oil filter state, as well as other parameters commonly transmitted over serial databus.

Additionally, for this embodiment, a receiver or bus recorder 126 is positioned in the avionics bay 120. In other embodiments, the bus recorder 126 can be located in other positions on the aircraft 110, such as e.g., the cockpit 116, a cargo hold, a cabin, on a wing, mounted to the engine, etc. The bus recorder 126 is communicatively coupled with the EECs 118 via the serial databus 124. Particularly, for this embodiment, bus recorder 126 is electrically coupled with the serial databus 124 between the EECs 118 and the vehicle interface unit 122. That is, the bus recorder 126 is electrically coupled with the serial databus 124 upstream of the vehicle interface unit 122. In accordance with example aspects of the present disclosure, the bus recorder 126 is operable to receive and store data transmitted over serial databus 124. More specifically, as will be explained in further detail herein, the bus recorder 126 is operable to receive and store divided portions of a data file transmitted over the serial databus 124. In some embodiments, each EEC 118 has an associated bus recorder 126.

The aircraft 110 also includes one or more communication units. For this embodiment, the aircraft 110 includes a wireless communication unit (WCU) 128. Although only one WCU is depicted in FIG. 1, it will be appreciated that the aircraft 110 can include multiple WCUs, or more generally, a plurality of communication units. For instance, each bus recorder 126 can have an associated WCU 128. As depicted in FIG. 1, the WCU 128 is communicatively coupled with the bus recorder 126 via a communication link 130, and can be in communication with other systems and devices of the aircraft 110. For instance, in some embodiments, the EECs 118 can be directly communicatively coupled with the WCU 128. The WCU 128 can be located in any suitable location on the aircraft 110.

Generally, the EECs 118 can record continuous engine operating data (CEOD) and other sensed, calculated, or predicted parameters associated with the engines 114 during operation and such data can be transmitted over serial databus 124 to the bus recorder 126. The data can be recorded by bus recorder 126 and transmitted over the communication link 130 to WCU 128. The bus recorder 126 and the WCU 128 can communicate over communication link 130 using wireless and/or wired communications. In some embodiments, the communication with the bus recorder 126 and the WCU 128 can be one-way communication (e.g., the bus recorder 126 to the WCU 128). In some embodiments, the communication with the bus recorder 126 and the WCU 128 can be two-way communication.

The WCU 128 can communicate (e.g., transmit, send, push, etc.) the data to a remote station via, for instance, an antenna of WCU 128. For this embodiment, the remote station is a ground station 150. In other embodiments, however, the remote station can be any suitable station positioned remote from the air station or aircraft 110. In some embodiments, the remote station can be a naval station, another air station, a space station, etc. The WCU 128 can communicate using wireless communication. The wireless communication can be performed using any suitable wireless technique and/or protocol. For example, the WCU 128 can communicate wirelessly using peer-to-peer communications, network communications, UHF, VHF, cellular-based communications, satellite-based communications, etc. For instance, as shown in FIG. 1, the WCU 128 can communicate with the ground station 150 via a VHF technique and/or via a UHF SATCOM utilizing one or more satellites 152. As further examples, the wireless communications can be performed using Wi-Fi, Bluetooth, ZigBee, etc., particularly when the aircraft 110 is on or near the ground.

The data acquisition system 100 also includes ground station 150. The ground station 150 includes one or more ground transceivers 154 (e.g., a satellite dish and/or cellular tower as shown in FIG. 1) and one or more ground computing devices 156 communicatively coupled thereto. The ground transceiver 154 is operable to receive data communications transmitted from the aircraft 110. The data communications can be routed to the ground computing device 156. As will be explained in greater detail herein, the ground computing device 156 is operable to receive the data communications and reconstitute the data, e.g., reconstruct the data file generated by one or more of the EECs 118. Further, the ground computing device 156 is operable to decode the reconstituted or reconstructed data file. In this way, the ground computing device 156 can render or output a human-readable file.

Figure 2:
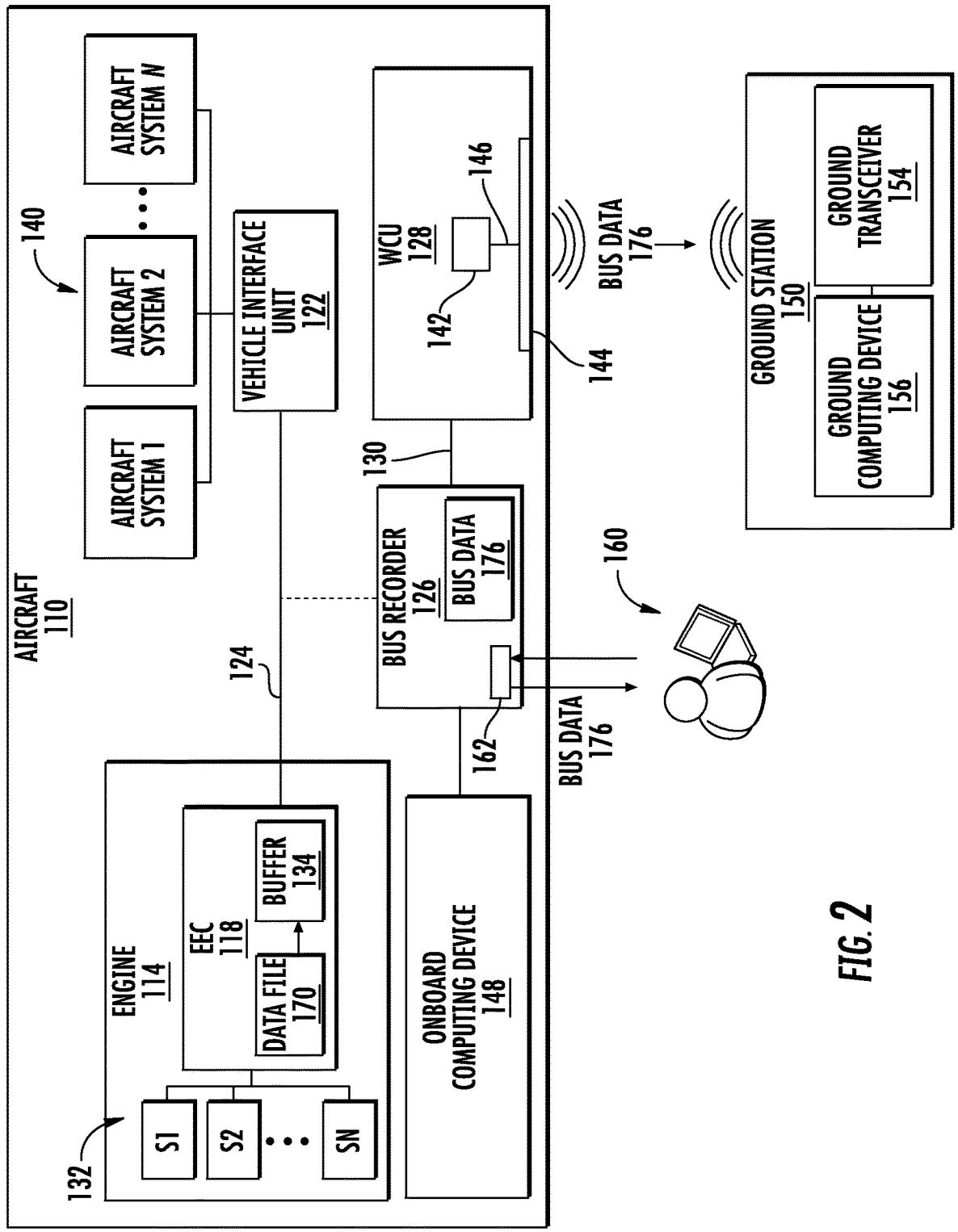
FIG. 2 provides another schematic view of the data acquisition system of FIG. 1.

FIG. 2 provides another schematic view of the data acquisition system 100. An example manner in which ground station may acquire data via the data acquisition system 100 will now be provided. As the engine operates and produces thrust for propulsion of the aircraft 110, EEC 118 records data relating to the engine 114, e.g., CEOD. More particularly, the engine 114 can include one or more sensors 132 that record various parameters relating to the engine 114, such as e.g., fan speed, core speed, temperatures at various stations along the core air flowpath, etc. For instance, as shown in FIG. 2, the engine 114 includes a first sensor S1, a second sensor S2, and so on to the Nth Sensor. Signals from the sensors S1, S2, SN can be routed to the EEC 118 and processed. The EEC 118 can then calculate or predict other parameters, such as exhaust gas temperature, mass flow at various stations of the engine 114, stall margin remaining, etc. The sensed, calculated, and predicted parameters can then be used to generate a binary data file 170 indicative of the CEOD, or continuous operating data. Particularly, the EEC 118 generates the binary data file 170 indicative of the CEOD.

Once the binary data file 170 is generated by the EEC 118, the binary data file 170 is stored in a buffer 134 or storage device of the EEC 118. In some embodiments, the EEC 118 writes the binary data file 170 to the buffer 134 on a continuing or rolling basis. In yet other embodiments, the EEC 118 writes the binary data file 170 to the buffer 134 at a predetermined interval, such as e.g., every 12 milliseconds, every 25 milliseconds, or every second.

Figure 3:
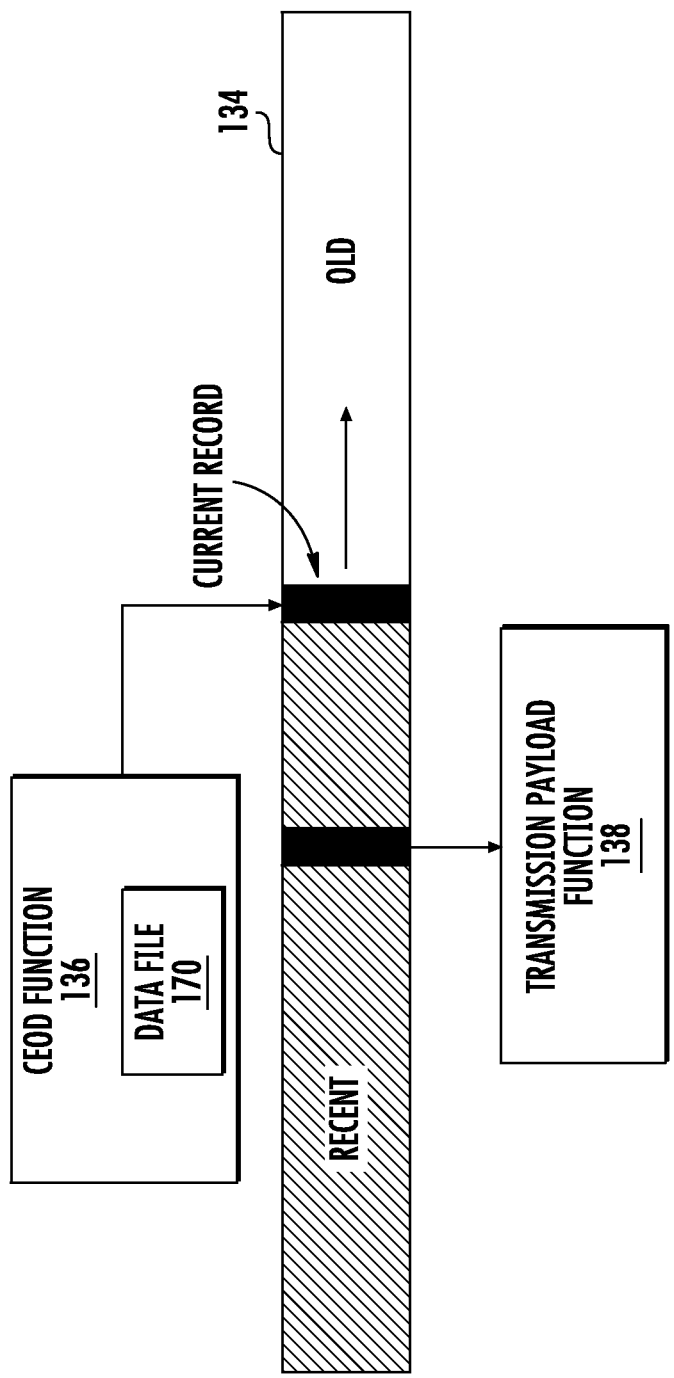
FIG. 3 provides a diagram of an example manner in which a data file can be stored or written to a buffer of the data acquisition system of FIG. 2.

FIG. 3 provides a diagram of an example manner in which the data file 170 can be stored or written to the buffer 134. As shown in FIG. 3, the buffer 134 is a circular buffer. That is, as data is written to the buffer 134, i.e., stored in the buffer 134, old data is overwritten. A data file function of the EEC 118 (FIG. 2), which for this embodiment is CEOD function 136, generates the data file 170 and writes the data file 170 to the buffer 134. In the depicted embodiment of FIG. 3, the CEOD function 136 moves from left to right overwriting old data with new data of the data file, hence the "RECENT" and "OLD" designations. The current record of the file being written to the buffer 134 is shown and represents the point at which new data is written over the old data stored in the buffer 134. As will be explained further below, a transmission payload function 138 of the EEC 118 retrieves or pulls a selectively-sized portion of the data based at least in part on a determined available bandwidth of a particular transmission frame of a transmission schedule for the serial databus 124 (FIG. 2).

FIG. 4 provides an example transmission schedule 180 for the serial databus 124 (FIG. 2). As shown, the transmission schedule 180 includes a plurality of transmission frames 182, which are organized by columns in the transmission schedule 180 of FIG. 4. Although the transmission schedule 180 of FIG. 4 is shown having 21 columns of transmission frames 182, the transmission schedule 180 can have any suitable number of transmission frames. Each transmission frame 182 has a plurality of associated slots 184, which are organized by rows in the transmission schedule 180 of FIG. 4. Although the transmission schedule 180 of FIG. 4 is shown having 20 rows of slots 184, the transmission schedule 180 can have any suitable number of transmission frames, such as e.g., 40 rows of slots 184. Each transmission frame 182 can correspond to a time step or refresh period of the EEC 118 (FIG. 2). For example, each transmission frame 182 can correspond to about 12 milliseconds.

For a given transmission frame 182, some of the slots 184 include data words packed into or allocated therein and some of the slots include zeros (0) or nulls. The data words, represented by numeric labels in FIG. 4, are indicative of a particular parameter sensed by one or more of the sensors 132 of the engine 114 (e.g., S1, S2, SN) or calculated or predicted by the EEC 118 (FIG. 2). For example, the label "300" of Transmission Frame 0: Slot 1 can correspond to a first parameter, the label "112" of Transmission Frame 1: Slot 1 can correspond to a second parameter, the label "167" of Transmission Frame 2: Slot 1 can correspond to a third parameter. As shown, the first parameter corresponding to label "300" repeats or is provided every fourth transmission frame, the second parameter corresponding to label "112" repeats or is provided every other transmission frame, and the third parameter corresponding to label "167" repeats or is provided every fourth transmission frame. Moreover, for the allocated slots 184, the labels do not successively repeat within a particular transmission frame. Notably, the data words allocated to the slots 184 shown in FIG. 4 are destined to be transmitted over serial databus 124 (FIG. 2) and received by vehicle interface unit 122 (FIG. 2). Such data words are then processed by the vehicle interface unit 122 and routed to various aircraft systems 140, such as Aircraft System 1, Aircraft System 2, and so on to the Nth Aircraft system as shown in FIG. 2.

Notably, with reference still to FIG. 4, some slots 184 of each transmission frame 182 do not include data words packed or allocated therein. Rather, they are null or unused slots. Thus, serial databus 124 has unused bandwidth or spare bandwidth capacity. In accordance with example aspects of the present disclosure, the EEC 118 (FIG. 2) is configured to determine an available bandwidth of a transmission frame for the serial databus 124 and allocate data to the unused slots 184, which are shaded in FIG. 4. For example, as depicted in FIG. 4, for Transmission Frame 0, Slots 11 to 20 are unused. Thus, 10 slots are unused in Transmission Frame 0. For Transmission Frame 4, Slots 9 to 20 are unused. Thus, 12 slots are unused in Transmission Frame 4. For Transmission Frame 17, Slots 4 to 20 are unused. Thus, 17 slots are unused in Transmission Frame 17. As shown, other transmission frames 182 have available bandwidth as well. Notably, the unused bandwidth of each transmission frame can vary. In addition, for this embodiment, a data word having up to 32 bits can be packed or allocated within a given slot. In some embodiments, each data word has between 19 and 23 bits available for use or for transmission of a particular transmission payload. An example data word is provided below.

Figure 5:
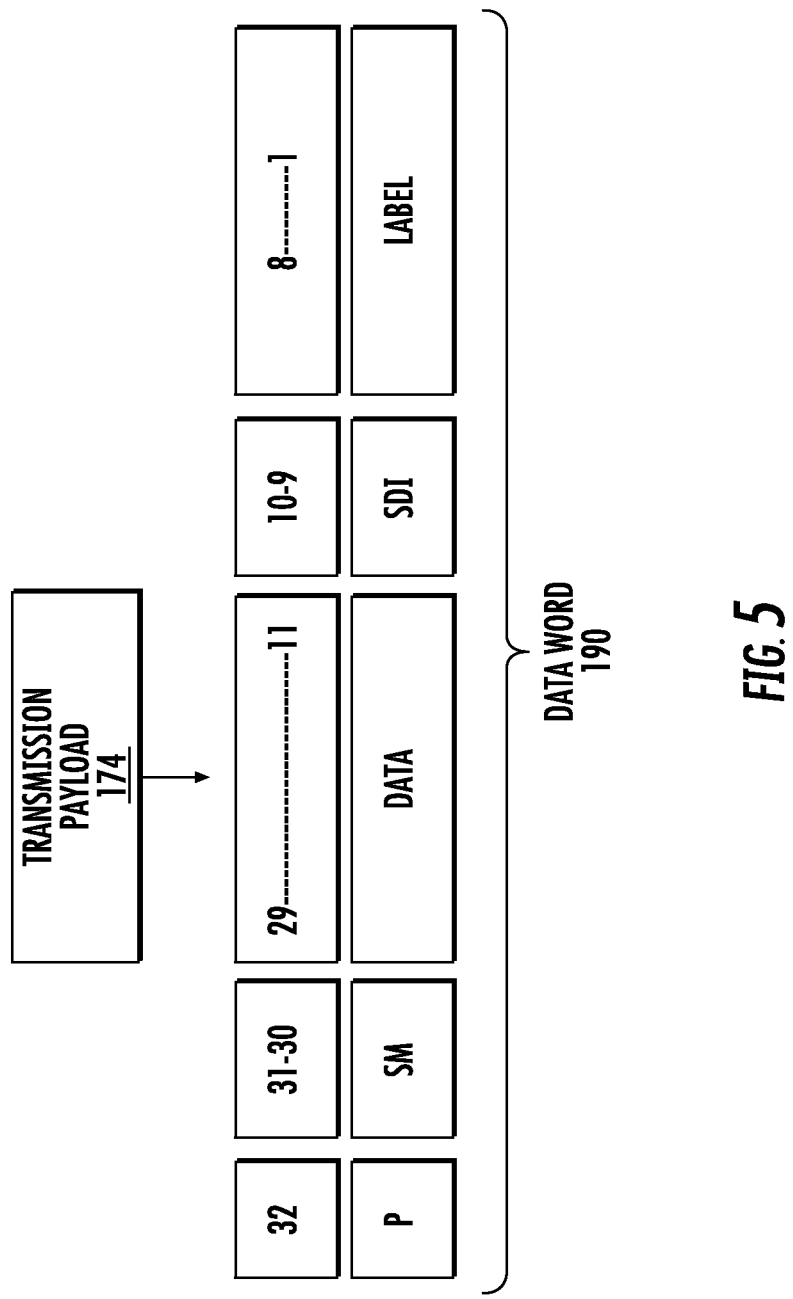
FIG. 5 provides a diagram of an example data word in accordance with an example embodiment of present disclosure.

FIG. 5 provides a diagram of an example data word 190 in accordance with an example embodiment of present disclosure. As shown, the data word 190 includes a number of fields, including (from right to left): a label field (Label) occupying 8 bits, a source/destination identifier field (SDI) occupying 2 bits, a data field (Data) that can occupy 19 bits, a sign/status matrix field (SM) occupying 2 bits, and a parity field (P) occupying 1 bit. The label field (Label) contains a label expressed in an octal format and identifies the data type. Portions of the label field are shown in the transmission schedule 180 of FIG. 4. The source/destination identifier field (SDI) can indicate the intended receiver (e.g., the bus recorder 126 of FIG. 2) or the transmitting system (e.g., the EEC 118 of FIG. 2). The sign/status matrix field (SM) can be used for a variety of purposes, such as e.g., to indicate whether the data is correct, valid, missing, etc. The parity field (P) can indicate whether the data word 190 has been damaged or garbled during transmission. Notably, the data field has available bits for receiving data, such as a transmission payload 174 as will be explained in detail herein. Depending on whether the SDI and SM fields are available, the available bits per data word 190 may be between 19 and 23 bits. It will be appreciated that the present disclosure is not limited to 32-bit data words having between 19 and 23 bits available per data word. Rather, the present disclosure applies to data words having other suitable bit sizes, e.g., 64 bits, and data words having other suitable amounts of available bits. Thus, data words having more or less than 32 total bits and less than 19 or greater than 23 available bits can be applied to or incorporated into the teachings disclosed herein without deviating from the scope of the present disclosure.

Returning to FIG. 4, the EEC 118 (FIG. 2) determines the available bandwidth by determining the number of slots available in a particular transmission frame 182 and can thus determine how many bits are available for transmitting data. For example, as 10 slots are unused in Transmission Frame 0, the EEC 118 can determine that 190 or 230 bits are available for transmission of the data file, depending on how many bits of each data word 190 (FIG. 5) are available. For instance, if 19 bits per data word are available (i.e., the SDI and SM fields are unavailable for use), 190 bits of data is the available bandwidth of Transmission Frame 0. If 23 bits per data word are available (i.e., the SDI and SM fields are both available for use), 230 bits of data is the available bandwidth of Transmission Frame 0. If some of the bits of the SDI and SM data fields are available in some data words and not others, the EEC 118 can make this determination and thus the available bandwidth of Transmission Frame 0 can be between 190 and 230 bits of data in some embodiments. The EEC 118 can determine the available bandwidth for each transmission frame 182 of the transmission schedule 180 in the manner described above. Generally, a greater number of slots available in a particular frame correlates with a greater bandwidth capacity of the transmission frame for transmitting a portion of the data file 170 (FIG. 2) generated by the EEC 118. In contrast, fewer slots available in a particular frame correlates with less bandwidth capacity of the transmission frame for transmitting a portion of the data file 170 generated by the EEC 118.

Figure 6:
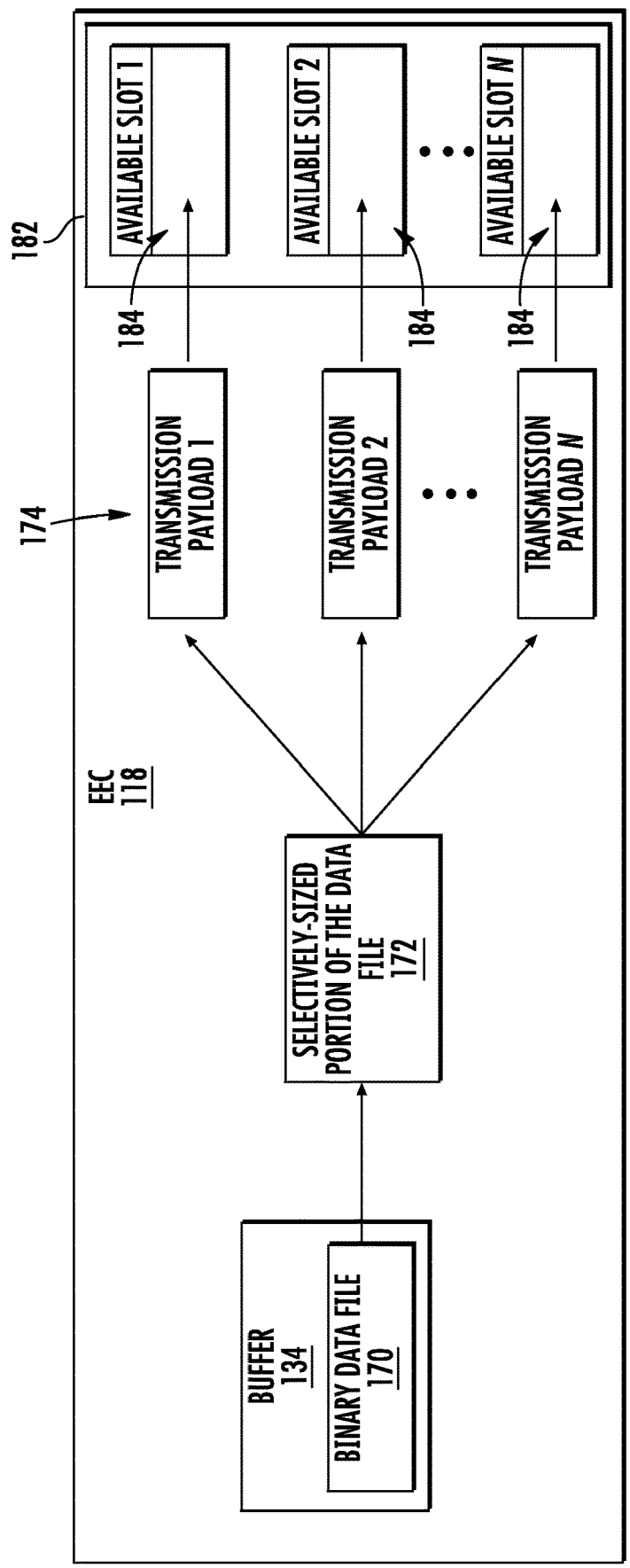
FIG. 6 provides a flow diagram for retrieving, dividing, and allocating portions of the data file in accordance with an example embodiment of present disclosure.

FIG. 6 provides a flow diagram for retrieving, dividing, and allocating portions of the data file 170 in accordance with an example embodiment of present disclosure. In particular, after the EEC 118 (FIG. 2) determines the available bandwidth of a given transmission frame 182 for the serial databus 124 (FIG. 2), the EEC 118 retrieves a selectively-sized portion 172 of the data file 170 based at least in part on the available bandwidth of the transmission frame 182. For instance, continuing with the example above, the EEC 118 can determine that the available bandwidth for Transmission Frame 0 (FIG. 4) is 190 bits (assuming that 19 bits per data word are available for use). That is, 10 slots of Transmission Frame 0 are available for a data word to be packed therein and each data word has 19 bits available for data; thus, 190 bits are available to transmit during Transmission Frame 0, or stated mathematically: (1 data word/available slot*10 available slots*19 bits/data word=190 bits). Accordingly, for Transmission Frame 0, the EEC 118 (or more particularly the transmission payload function 138 (FIG. 3) retrieves the selectively-sized portion 172 of the data file 170. In this example, the selectively-sized portion 172 of the data file 170 is 190 bits. Thus, the transmission payload function 138 (FIG. 3) of the EEC 118 pulls or retrieves 190 bits of data from the buffer 134.

Once the selectively-sized portion 172 of the data file 170 is retrieved or pulled from the buffer 134, the transmission payload function 138 (FIG. 3) of the EEC 118 divides or splits the retrieved selectively-sized portion 172 of the data file 170 into transmission payloads 174. For instance, as shown in FIG. 6, the retrieved selectively-sized portion 172 of the data file 170 is divided into Transmission Payload 1, Transmission Payload 2, and so on to the Nth Transmission Payload N. Generally, the retrieved selectively-sized portion 172 of the data file 170 is divided into transmission payloads 174 based on the available bits of each data word to be transmitted in the transmission frame. In this example, the selectively-sized portion 172 (containing 190 bits of data) is divided or split into 10 transmission payloads each containing 19 bits of data from the retrieved portion 172 of the data file 170.

Once the selectively-sized portion 172 of the data file 170 is divided into transmission payloads 174, the divided transmission payloads 174 are allocated or packed into available slots 184 of the transmission frame. For instance, as shown in FIG. 6, the transmission payloads are allocated or packed into available slots of the transmission frame. Particularly, Transmission Payload 1 is allocated or packed into Available Slot 1, Transmission Payload 2 is allocated or packed into Available Slot 2, and Transmission Payload N is allocated or packed into Available Slot N. Continuing with the example above, for Transmission Frame 0 of the transmission schedule 180 of FIG. 4, Available Slot 1 corresponds with Slot 11 of the transmission schedule 180, Available Slot 2 corresponds with Slot 12 of the transmission schedule 180, and Available Slot N corresponds with Slot 20 of the transmission schedule 180.

In some embodiments, prior to allocating or packing the transmission payloads into available slots, the transmission payloads are loaded into respective data words, which are then allocated or packed into the available slots of the transmission frame. Thus, in some embodiments, each transmission payload forms a portion of a data word. For instance, as shown in FIG. 5, the transmission payload 174 is shown being loaded into the example data word 190. Further, a label can be assigned to each data word 190 based at least in part on the data being loaded into the data field of the data word 190. Thus, each data word 190 having a transmission payload loaded therein has an assigned label. The label, among other things, can indicate that the transmission payload 174 or data word 190 is associated with the data file 170 (FIG. 2). Moreover, the source/destination identifier field (SDI) can indicate the intended receiver as the bus recorder 126 (FIG. 2). Accordingly, the data file 170 can be reconstituted and decoded more readily and in a more efficient manner as will be explained in detail herein.

FIG. 7 provides another view of the example transmission schedule 180 for the serial databus 124 (FIG. 2) depicting data words allocated or packed into the available slots of Transmission Frame 0. In FIG. 7, the data words are represented by the label of the data word. As shown, the data words are allocated or packed into the available slots, which are Slots 11-20 of Transmission Frame 0. Notably, the bandwidth of Transmission Frame 0 is maximized as no available bandwidth remains.

Further, as shown, the labels indicating the transmission payload is associated with the data file are allocable into more than one of the available slots of the transmission frame. For instance, as shown in FIG. 7, Transmission Frame 0 includes some labels that repeat multiple times, such as e.g., Label 122 in Slots 11 and 12, Label 123 in Slots 13 and 14, and Label 125 in Slots 16, 17, and 18. Conventionally, a label of a data word would not be repeated more than once in a single transmission frame because vehicle interface units typically require one label per transmission frame for processing and distribution of the data to various aircraft systems and the like for controlling the vehicle. In accordance with example aspects of the present disclosure, the bus recorder 126 (FIG. 2) is operable to "listen in" on the serial databus 124 and record the data transmitted over the serial databus 124. The bus recorder 126 can receive and record/store data from transmission frames with repeating labels as the bus recorder 126 is not constrained or limited in the same way that vehicle interface units are typically limited.

Figure 8:
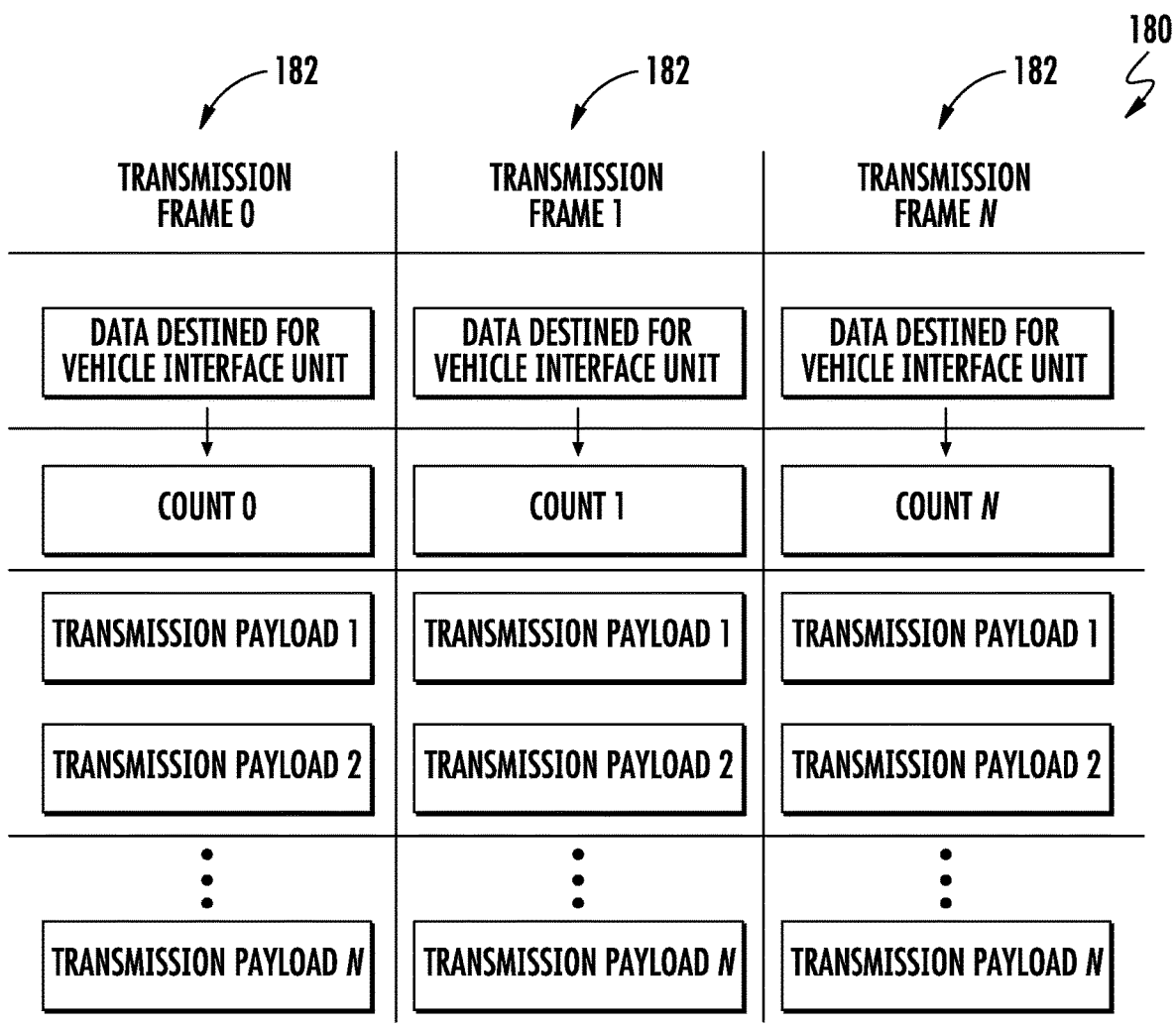
FIG. 8 provides a view of a portion of an example transmission schedule depicting various transmission frames in accordance with an example embodiment of present disclosure.

Further, in some example embodiments, one or more of the data words allocated or packed into an available slot of a given transmission frame can include a counter payload indicating a count of the transmission frame. The counter payload can be included as part of the label field, the data field, or some other suitable field of a given data word. By way of example, as shown in FIG. 8, a portion of a transmission schedule 180 depicting various transmission frames 182 is provided. As shown, for Transmission Frame 0, a plurality of data words are packed into slots and are destined for the vehicle interface unit 122 (FIG. 2). For example, the data within these slots can be the data within Slots 1-10 of the Transmission Frame 0 of FIGS. 4 and 7. The first data word packed into the first available slot of Transmission Frame 0 includes a sync or counter payload, indicated by Count 0, which corresponds with Transmission Frame 0. Similarly, for Transmission Frame 1, the first data word packed into the first available slot of Transmission Frame 1 includes a sync or counter payload, indicated by Count 1, which corresponds with Transmission Frame 1. The first data word of each transmission frame that is associated with the data file 170 can likewise include a counter payload up to the Nth transmission frame of the transmission schedule. This may facilitate reconstituting and decoding of the data file, for example. In other embodiments, the counter payload can be included at the end or in the last slot of a given transmission frame.

Figure 9:
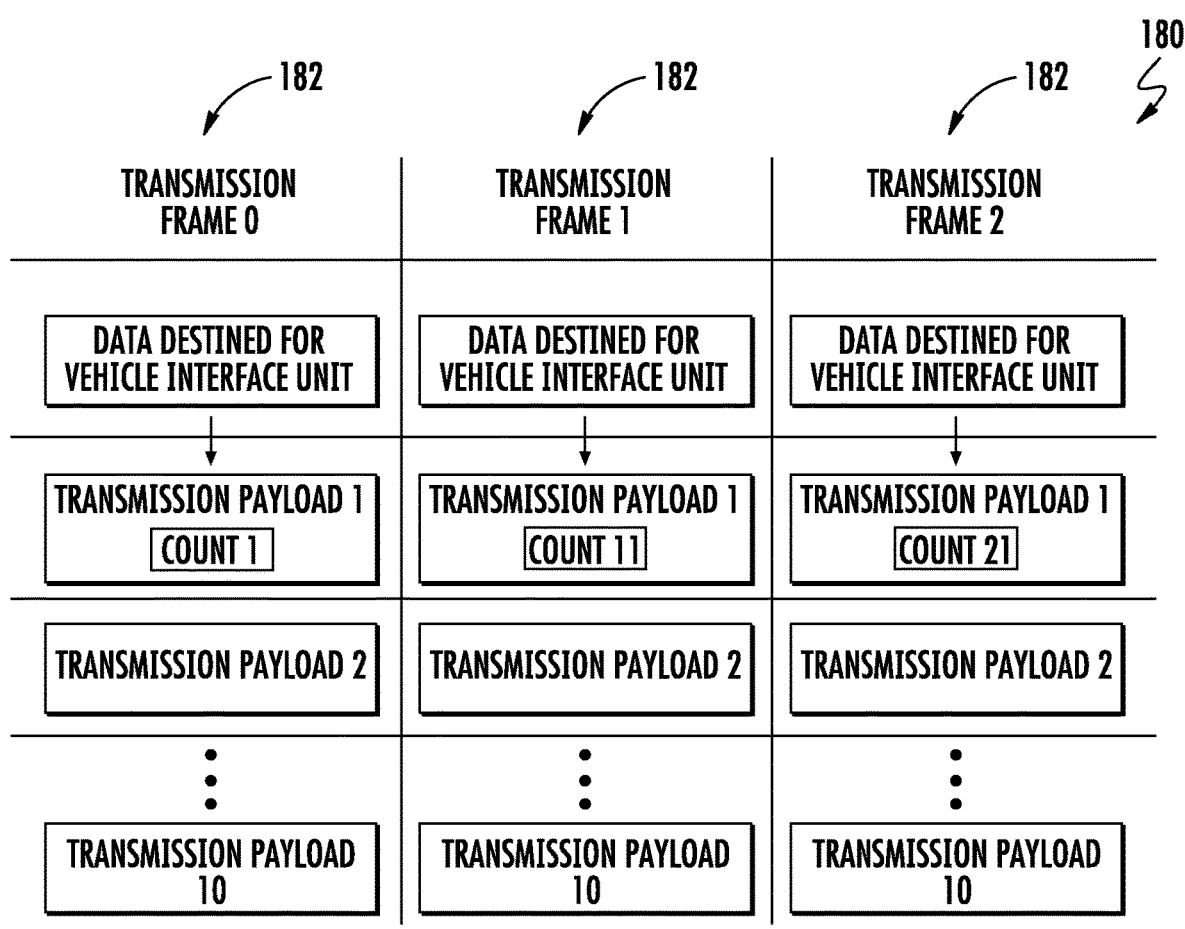
FIG. 9 provides a view of a portion of an example transmission schedule depicting various transmission frames in accordance with an example embodiment of present disclosure.

In yet other example embodiments, one or more of the data words can include a counter payload indicating a transmission payload count. The counter payload can be included as part of the label field, the data field, or some other suitable field of a given data word. By way of example, as shown in FIG. 9, a portion of a transmission schedule 180 depicting various transmission frames 182 is provided. As shown, for Transmission Frame 0, a plurality of data words are packed into slots and are destined for the vehicle interface unit 122 (FIG. 2). For example, the data within these slots can be the data within Slots 1-10 of the Transmission Frame 0 of FIGS. 4 and 7. The first data word packed into the first available slot of Transmission Frame 0 is labeled as Transmission Payload 1 and Transmission Payload 1 includes a sync or counter payload, indicated by Count 1, which corresponds with the start of the transmission payload count. Similarly, for Transmission Frame 1, the first data word packed into the first available slot of Transmission Frame 1 is labeled as Transmission Payload 1 and Transmission Payload 1 includes a sync or counter payload, indicated by Count 11, which corresponds with the transmission payload count. For this example, 10 transmission payloads were transmitted over serial databus 124 (FIG. 2) via Transmission Frame 0, and thus, the first data word packed into the first available slot of Transmission Frame 1 is counted as the 11th transmission payload. In a similar manner, for Transmission Frame 2, the first data word packed into the first available slot of Transmission Frame 2 is labeled as Transmission Payload 1 and Transmission Payload 1 includes a sync or counter payload, indicated by Count 21, which corresponds with the transmission payload count. For this example, 10 transmission payloads were transmitted over serial databus 124 via Transmission Frame 0 and 10 transmission payloads were transmitted over serial databus 124 via Transmission Frame 1, and thus, the first data word packed into the first available slot of Transmission Frame 2 is counted as the 21st transmission payload. The count can continue with subsequent transmission frames. Counting the transmission payloads in the manner described above may facilitate reconstituting and decoding of the data file at a later time, for example.

In other embodiments, the counter or sync payload indicating the transmission payload count or the transmission frame can be included at other intervals. For instance, a counter payload can be included in a data word at the beginning and/or end of each transmission schedule, e.g., at the end of the 21 transmission frames of the transmission schedule 180 in FIGS. 4 and 7. The counter payload can be indicative of the transmission schedule, for example.

With reference now to FIG. 2, once the data words or transmission payloads are allocated or packed into the available slots of the transmission frame, the transmission frame is transmitted over the serial databus 124 and is received by the bus recorder 126. The vehicle interface unit 122 and the bus recorder 126 both receive the transmission frame transmitted over the serial databus 124. As will be appreciated, the process of retrieving a selectively-sized portion of the data file 170 based at least in part on the determined available bandwidth of a given transmission frame, dividing the selectively-sized portion of the data file 170 into transmission payloads, loading the transmission payloads into data words and assigning a label thereto, and allocating or packing the data words into an available slot of the given transmission frame can be repeated for each transmission frame of the transmission schedule. For instance, the process can be repeated every 12 milliseconds.

The vehicle interface unit 122 can receive the transmission frame and extract the labels or data words associated with parameters necessary to operate the vehicle 110, e.g., the data from Slots 1-10 of Transmission Frame 0 of the transmission schedule 180 of FIGS. 4 and 7. In some embodiments, the vehicle interface unit 122 is operable to ignore the divided transmission payloads (or the data words associated with the divided transmission payloads) allocated into the available slots of the transmission frame. The vehicle interface unit 122 can readily ignore the slots of the transmission frame associated with data from the binary data file 170. For instance, the vehicle interface unit 122 can recognize the labels of Slots 11-20 of Transmission Frame 0 of the transmission schedule 180 of FIGS. 4 and 7 as being associated with the binary data file 170. Additionally or alternatively, the vehicle interface unit 122 can recognize or determine that the source/destination identifier field (SDI) indicates the bus recorder 126 as the intended receiver. Accordingly, normal operation of vehicle interface unit 122, and more broadly vehicle 110, is not interrupted by the bus recorder 126 or usage of the available bandwidth of the serial databus 124.

As noted above, the bus recorder 126 receives the transmission frame transmitted over the serial databus 124 and can store the transmission frame in a memory device of the bus recorder 126. More particularly, the bus recorder 126 receives the plurality of transmission frames of the transmission schedule transmitted over the serial databus 124 and can store the transmission frames in a memory device of the bus recorder 126. The plurality of transmission frames of the transmission schedule 180 can be continuously transmitted over the serial databus 124 and are received by the bus recorder 126. In some embodiments, the bus recorder 126 can store all of the data transmitted over the serial databus 124, i.e., the data of each data word of each transmission frame. In yet other embodiments, the bus recorder 126 can be selective as to the data it records. For instance, the bus recorder 126 can record only the data associated with the CEOD data file 170, e.g., by recognizing the association of the label or the SDI field indicating the bus recorder 126 as the intended receiver of the data. Additionally or alternatively, the bus recorder 126 can commence recording data upon recognizing a count or sync label. Once the bus recorder 126 recognizes the count or sync label, the bus recorder 126 can record the remainder of the data of the data words within the transmission frame and may stop recording until a count label is recognized in the next transmission frame. In some embodiments, the vehicle 110 (FIG. 1) or the bus recorder 126 itself can timestamp or provide a counter that stamps or organizes the data periodically. In this way, reconstitution and decoding the data file at a later time and place, e.g., at a ground station, can be accomplished more easily.

The data received and stored/recorded in the bus recorder 126 can be transmitted or otherwise downloaded to other sources in a number of suitable ways. For instance, the data recorded by the bus recorder 126 can be wirelessly transmitted, e.g., to ground station 150, to another aircraft or vehicle, etc. For example, the data recorded by the bus recorder 126 can be wirelessly transmitted in-flight over SATCOM and/or Air to Ground (ATG) technology. As another example, the data recorded by the bus recorder 126 can be wirelessly transmitted post-flight over a cellular, Wi-Fi, and/or Bluetooth network.

By way of example, as shown in FIG. 2, the WCU 128 is operable to transmit the plurality of transmission frames (collectively bus data 176) to the ground station 150. As depicted, for this embodiment, the WCU 128 includes a radio frequency (RF) interface 142 and an antenna 144. In other example embodiments, the antenna 144 is located in another suitable location on the aircraft 110. The RF interface 142 is communicatively coupled with the antenna 144 via an RF cable 146. In some embodiments, bus data 176 recorded by bus recorder 126 is transmitted to WCU 128 via communication link 130 to RF interface 142. The bus data 176 is routed along RF cable 146 to antenna 144. The antenna 144 then transmits the bus data 176 wirelessly. As shown, the bus data 176 can be wirelessly transmitted to the ground station 150 and received by ground transceiver 154. The bus data 176 can then be routed to ground computing device 156, which may be a plurality of computing devices.

In some example embodiments, the ground computing device 156 receives the bus data 176 recorded by the bus recorder 126 and reconstitutes the data file 170 based at least in part on the bus data 176. That is, the ground computing device 156 reconstructs the data file 170 based at least in part on the bus data 176. For instance, reconstituting the data file 170 can include extracting the transmission payloads from the data words of each of the plurality of transmission frames. Reconstituting the data file 170 can also include sequentially constructing the transmission payloads into a reconstituted data file, which as noted previously, can be a binary data file indicative of CEOD. The ground computing device 156 can use the payload counters of the data to facilitate organization and reconstituting of the bus data 176. The bus data 176 can also include metadata, communication logs, error logs, etc. and the ground computing device 156 can utilize this to reconstitute the data file 170.

Figure 10:
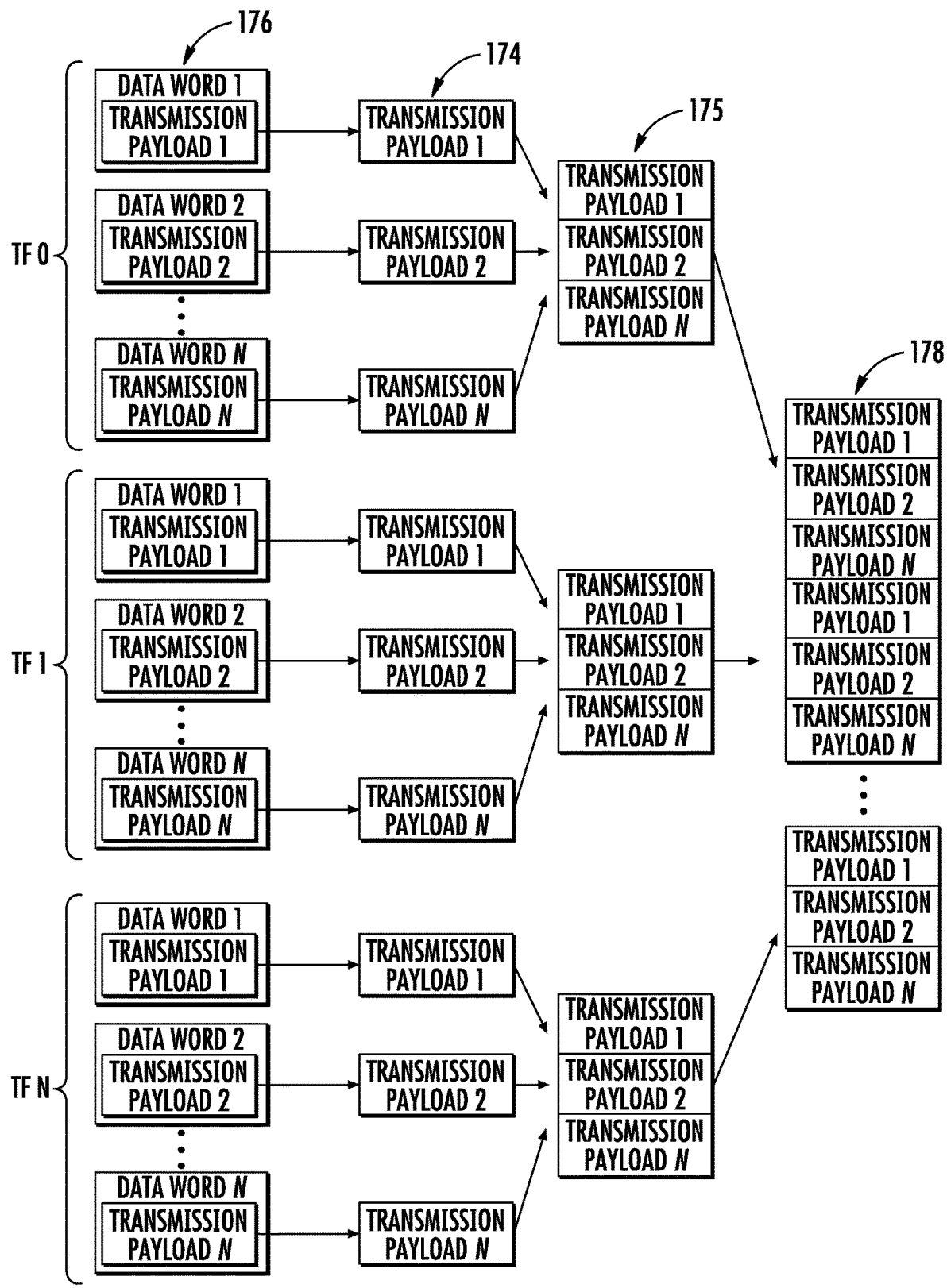
FIG. 10 provides a block diagram depicting an example manner in which bus data can be reconstituted in accordance with an example embodiment of the present disclosure.

FIG. 10 provides a block diagram depicting an example manner in which the bus data 176 can be reconstituted in accordance with an example embodiment of the present disclosure. As shown, the transmission payloads 174 are first extracted or pulled from the data fields and potentially other fields of the data words of the transmission frames of the bus data 176, denoted as TF 0, TF 1, and TF N. The transmission payloads of each transmission frame are then collected together into frame packets 175. The frame packets 175 are then sequentially added together to form the reconstituted data file 178. In some embodiments, the transmission payloads 174 need not be collected together as frame packets 175; rather, the extracted transmission payloads 174 can be directly written to the reconstituted data file 178.

With reference now to FIGS. 2 and 10, in some further embodiments, the ground computing device 156 is configured to decode the reconstituted data file, e.g., based at least in part the plurality of transmission frames or bus data 176 transmitted to the ground station 150 by the communication unit of the vehicle 110 to render a human-readable file. For instance, like the binary data file 170 generated by the EEC 118, the reconstituted data file 178 is also a binary data file 170. The reconstituted data file 178 is thus generally only a machine readable file. To make the reconstituted data file 178 more useful, the ground computing device 156 decodes the reconstituted data file, e.g., to convert the binary numbers into human-readable values, units, etc. The ground computing device 156 can decode the reconstituted data file 178 using any suitable technique. In some embodiments, the reconstituted data file 178 can be sent to a downstream or end user, and the downstream or end user can decode the reconstituted data file 178. By decoding the reconstituted data file 178, the reconstituted and decoded data file can be made available for visualization, analysis, archiving, etc.

Additionally or alternatively, the bus data 176 recorded by the bus recorder 126 can be transmitted via one or more wired connections, e.g., to a portable maintenance access terminal (PMAT). Particularly, in some embodiments, the bus recorder 126 can include an interface for communicating with one or more PMATs 160. The access terminal can be implemented, for instance, on a laptop, tablet, mobile device, or other suitable computing device. The interface can be, for instance, a Ground Support Equipment (GSE) interface 162 or other suitable interface. The PMAT 160 can be used by maintenance professionals to retrieve data from the bus recorder 126, among other possible tasks. For instance, the PMAT 160 can be used to calibrate, troubleshoot, initialize, test, etc. the bus recorder 126. The PMAT 160 can itself be used to reconstitute and/or decode the bus data 176 or the PMAT 160 can be used as intermediary between the bus recorder 126 and other computing devices configured to process the bus data 176. As noted previously, in some embodiments, the bus recorder 126 is positioned within the cockpit 116 or the avionics bay 120 of the aircraft 110. In this way, the bus recorder 126 is more accessible for the PMAT 160 to connect thereto. That is, wires connecting the PMAT 160 with the bus recorder 126 need not be run through the cowl of the engine 114 and can be connected to the bus recorder 126 and a more open area. In yet other embodiments, the bus recorder 126 is a removable media that can be easily removed from the vehicle 110, transported to a download location, and returned to its position onboard the vehicle 110. In this way, no devices or wires need be wired to the bus recorder 126 while it is onboard the vehicle 110.

Figure 11:
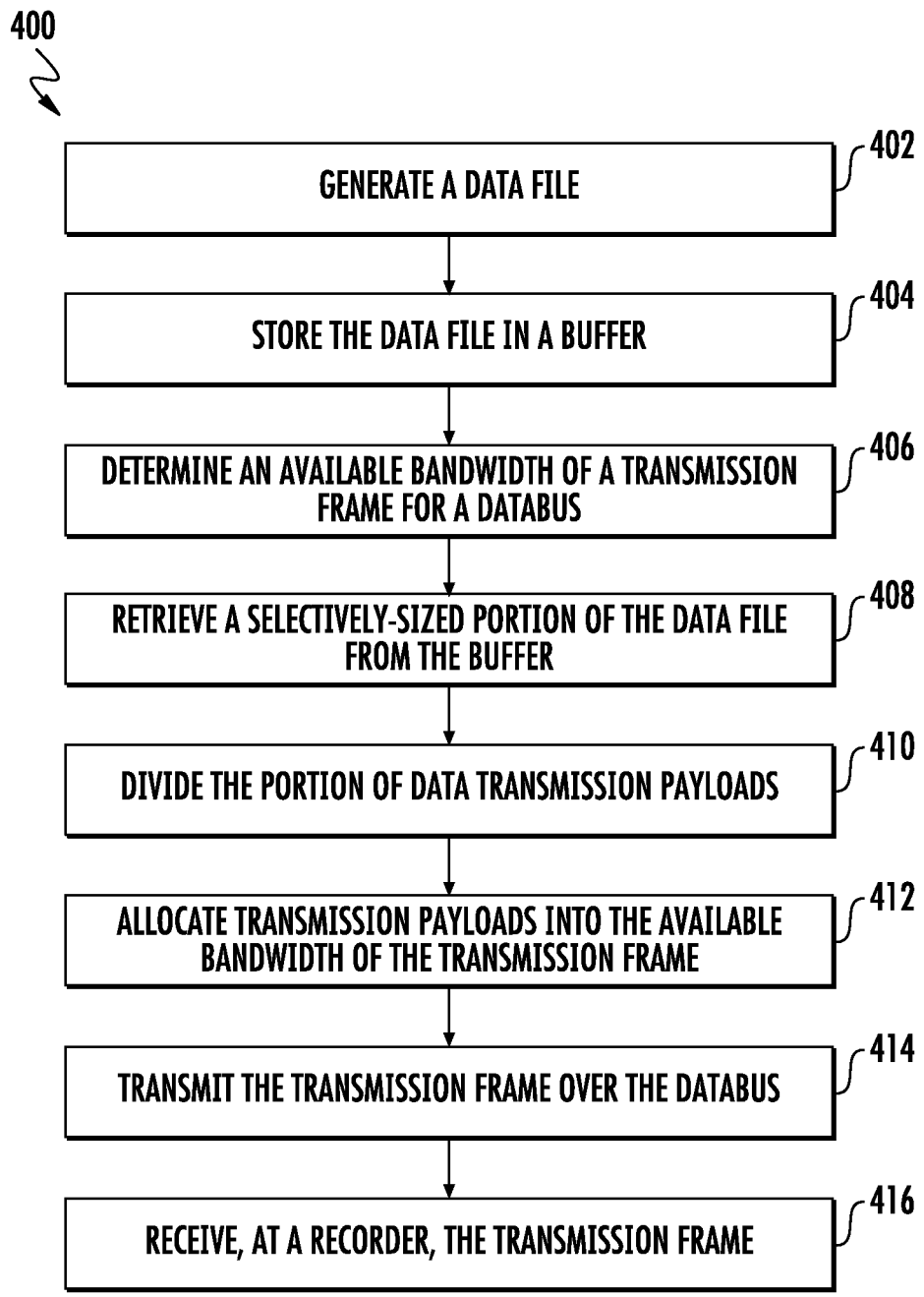
FIG. 11 provides a flow diagram of an example method for transmitting a data file over a serial databus in accordance with an example embodiment of the present disclosure.

FIG. 11 provides a flow diagram of an example method (400) for transmitting a data file over a serial databus. The method (400) of FIG. 11 can be implemented using, for instance, the various components of system 100 of FIGS. 1 and 2. FIG. 11 depicts steps performed in a particular order for purposes of illustration and discussion. Those of ordinary skill in the art, using the disclosures provided herein, will understand that various steps of any of the methods disclosed herein can be modified in various ways without deviating from the scope of the present disclosure.

At (402), the method (400) includes generating, by one or more computing devices positioned onboard a vehicle, a data file. For instance, the one or more computing devices can be the EECs 118 of the aircraft 110 of FIG. 1. The EECs 118 can receive one or more sensor inputs from sensors (e.g., S1, S2, SN of FIG. 2) positioned onboard the one or more engines 114 of the aircraft 110. The EECs 118 can generate a data file based at least in part on the one or more sensor inputs. For example, the EECs 118 can generate continuous engine operation data, or CEOD, based at least in part on the one or more sensor inputs.

At (404), the method (400) includes storing, by the one or more computing devices, the data file in a storage device of the one or more computing devices. For instance, the EEC 118 can store the data file in a storage device of the EEC 118. The storage device can be buffer 134, for example. The buffer 134 can be a circular buffer. As shown in FIG. 3, the EEC 118 can continuously store or write data to the buffer 134, e.g., via CEOD function 136. As the CEOD function 136 writes the data file 170 to the buffer 134, the new data being written to the buffer 134 can overwrite old data previously written to the buffer 134.

At (406), the method (400) includes determining, by the one or more computing devices, an available bandwidth of a transmission frame for a serial databus. For example, with reference to FIG. 4, the transmission schedule 180 includes 21 transmission frames organized by columns and 20 slots per transmission frame. The slots are organized by rows. Each slot of each transmission frame is configured to receive a data word. The data word has a predetermined number of bits. Specifically, the data word has a number of bits available for data transmission. For example, a data word can have 19 bits available for data to be loaded into the data word, e.g., in the data field of the data word. As another example, the data word can have 23 bits available for data to be loaded into the data word. As yet another example, the data word can have between 19 and 23 bits available for data to be loaded into the data word. In some implementations, determining the available bandwidth for a particular transmission frame for a serial data bus includes determining the number of available slots and determining the number of available bits per data word. For example, with reference to Transmission Frame 8 of the transmission schedule 180 of FIG. 4, 15 slots are available (i.e., Slots 6 to 20). Supposing that each data word has 23 bits available, the EEC 118 can determine that Transmission Frame 8 has 345 bits of available bandwidth. This same process can be utilized to determine the bandwidth for each transmission frame of the transmission schedule.

At (408), the method (400) includes retrieving, by the one or more computing devices, a selectively-sized portion of the data file based at least in part on the available bandwidth of the transmission frame. For instance, the selectively-sized portion of the data file 170 retrieved from the buffer 134 of the EEC 118 can be the determined available bandwidth of the transmission frame. Continuing with the example above, for Transmission Frame 8, the determined available bandwidth was 345 bits. Accordingly, the selectively-sized portion of the data file retrieved from the buffer 134 is 345 bits. In some implementations, however, the selectively-sized portion of the data file retrieved from the buffer 134 can be less than the available bandwidth determined. For example, it may be undesirable to load the serial databus at full capacity in some instances or some of the available bandwidth can be used for other purposes, such as e.g., using the available bandwidth for a counter payload or the like. As shown best in FIG. 3, the selectively-sized portion of the data file 170 can be retrieved or pulled from the buffer 134 by the transmission payload function 138. Particularly, the transmission payload function 138 can move generally left to right retrieving portions of the data file 170 and can lag behind the CEOD function 136 writing the data file 170 to the buffer 134.

At (410), the method (400) includes dividing, by the one or more computing devices, the retrieved selectively-sized portion of the data file into transmission payloads. For instance, as shown best in FIG. 6, the retrieved selectively-sized portion of the data file is divided into one or more transmission payloads for a particular transmission frame. In some implementations, each transmission payload includes between 19 and 23 bits. The number of transmission payloads that the portion of retrieved data is divided is based at least in part on the available bandwidth of the transmission frame, or more particularly, the number of available slots of the transmission frame and the available bits per data word.

For example, for Transmission Frame 8, the determined available bandwidth was 345 bits and each data word has 23 available bits; thus, for Transmission Frame 8, the retrieved portion of data having 345 bits is divided into 15 transmission payloads.

In some implementations, after dividing, by the one or more computing devices, the retrieved selectively-sized portion of the data file into transmission payloads at (410), the method (400) includes loading, by the one or more computing devices, the divided transmission payloads into data words. More particularly, each divided transmission payload is loaded into the data field, and in some instances, the SDI field and the SM field of the data word (see FIG. 5). Further, in some implementations, the method (400) includes assigning, by the one or more computing devices, a label to each data word that indicates or is representative of the data in the transmission payload. In some instances, the label can indicate that the data word is associated with the data file 170.

At (412), the method (400) includes allocating, by the one or more computing devices, the divided transmission payloads into slots of the transmission frame. That is, the transmission payloads are packed into the available slots of the transmission frame. In some implementations, the data words in which the transmission payloads are loaded are packed or allocated into the slots. Continuing with the example above, for Transmission Frame 8, the divided transmission payloads (or data words in which they are loaded) can be loaded into Slots 6-20 as shown best in FIG. 7. In Transmission Frame 8, Slots 1-5 are utilized for transmitting various data words relating to various parameters that are destined for the vehicle interface unit 122 (FIG. 2), e.g., so that they can be utilized to control the aircraft 110 (FIGS. 1 and 2). Thus, Transmission Frame 8 has one or more non-available slots having one or more data words allocated therein. Accordingly, Slots 1-5 include data associated with parameters destined for the vehicle interface unit 122 (e.g., for controlling the aircraft 110). The data of Slots 1-5 is unrelated to the data file 170. On the other hand, Slots 6-20 include data associated with the data file. As all slots of Transmission Frame 8 are utilized, the bandwidth of Transmission Frame 8 is at full bandwidth capacity.

At (414), the method (400) includes transmitting, over the serial databus, the transmission frame. Once the transmission frame is packed with data associated with parameters destined for the vehicle interface unit 122 (e.g., Slots 1-5 of Transmission Frame 8) and with data associated with the data file (e.g., Slots 6-20 of Transmission Frame 8), the transmission frame can be transmitted over the serial databus, e.g., an ARINC429 databus. The transmission frame can be transmitted over the serial databus in any suitable manner.

At (416), the method (400) includes receiving, at a recorder positioned onboard the vehicle and communicatively coupled with the one or more computing devices, the transmission frame. For instance, the recorder can be the bus recorder 126 of FIG. 2. The bus recorder 126 "listens in" and receives the transmission frame. The bus recorder 126 can then record or store the transmission frame. As will be appreciated, the data file can be continuously generated and stored or written to the buffer 134 by the one or more computing devices. Then, for each transmission frame of the transmission schedule, the one or more computing devices can determine an available bandwidth of the given transmission frame, a selectively-sized portion of the data file is retrieved from the buffer based at least in part on the available bandwidth for the given transmission frame, the selectively-sized portion of the data file is then divided into transmission payloads, the transmission payloads can be allocated into slots of the given transmission frame (or the data words in which the transmission payloads are loaded can be allocated or packed into the slots), the given transmission frame is transmitted over the serial databus, and finally, the given transmission frame is received by the recorder. Collectively, the received transmission frames, and other data recorded by the recorder, is denoted as the bus data. The plurality of transmission frames of the transmission schedule can be continuously transmitted over the serial databus and received by the recorder.

In some implementations, the recorder is communicatively coupled with a wireless communication unit. For instance, the wireless communication unit can be the WCU 128 of FIG. 2. In such implementations, the method (400) can include storing, by the recorder, the received plurality of transmission frames as bus data. The method (400) can also include transmitting, via the wireless communication unit, the bus data to a ground station, or more broadly, a remote station (i.e., a station offboard the aircraft or air station). For instance, as shown in FIG. 1, the WCU 128 can communicate with the ground station 150 via a suitable ATG technique, such as e.g., a VHF technique, and/or via a UHF SATCOM technique utilizing satellites 152 and the satellite dish 154 as the ground station transceiver or receiver. As further examples, the wireless communications can be performed using Wi-Fi, Bluetooth, ZigBee, etc., particularly when the aircraft 110 is on or near the ground. Additionally or alternatively, in yet other implementations, method (400) can also include transmitting, via a wired connection, the bus data to a remote station, such as e.g., PMAT 160.

In some implementations, the method (400) further includes receiving, by a remote computing device, the bus data. For instance, the remote computing device can be the ground computing device 156 of the ground station 150 of FIGS. 1 and 2. Once the bus data is received by the remote or ground station, the method (400) can include reconstituting the data file based at least in part on the bus data. In this way, the ground computing device 156 can render or yield a reconstituted data file, e.g., a binary reconstituted data file indicative of the CEOD generated by one or more EECs 118 of the aircraft 110. FIG. 10 provides an example manner in which a data file can be reconstituted.

Moreover, in some implementations, the method (400) can include decoding, by a remote computing device, the reconstituted data file. By decoding the reconstituted data file, the remote computing device can render or yield a human-readable file. By decoding the reconstituted data file, the reconstituted and decoded data file can be made available for visualization, analysis, archiving, etc.

In some alternative implementations, as shown best in FIG. 2, one or more onboard computing devices 148 positioned onboard the aircraft can be communicatively coupled with the recorder 126. In such implementations, the bus data 176 can be transmitted or otherwise routed to the one or more onboard computing devices 148. The one or more onboard computing devices 148 can then reconstitute and decode the bus data 176 to render a reconstituted and decoded human-readable data file.

Figure 12:
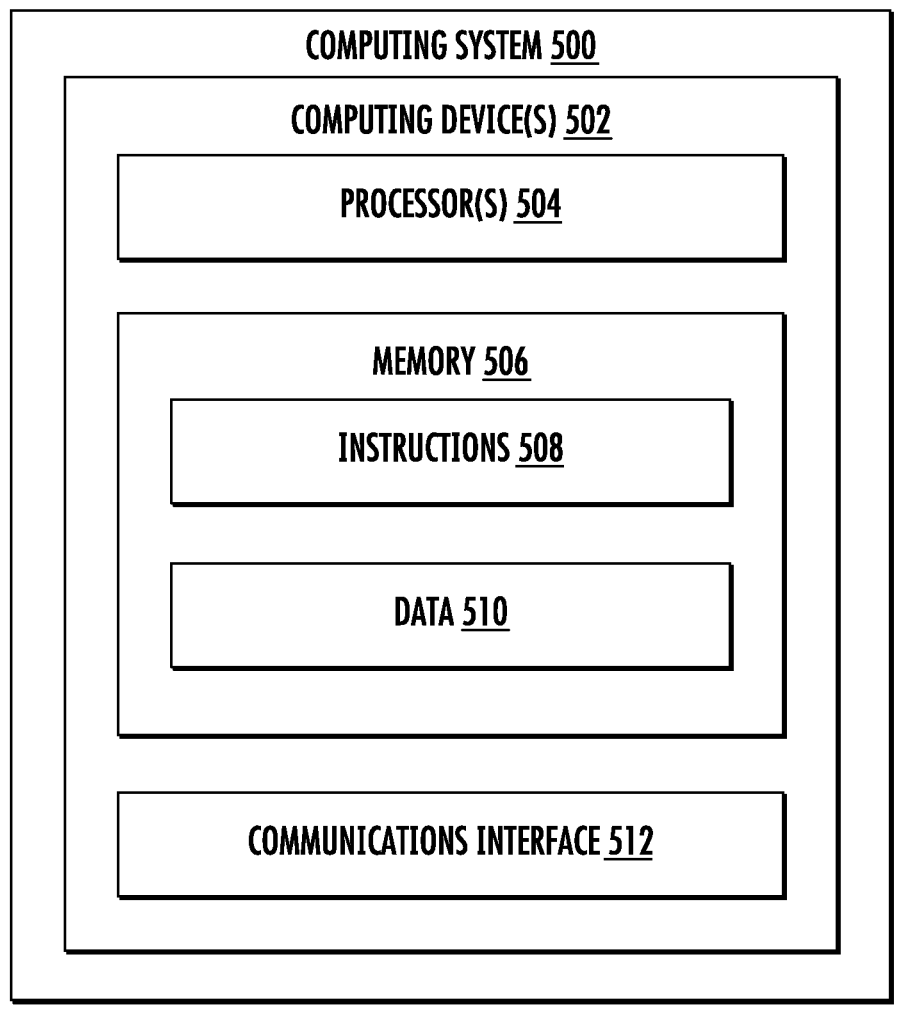
FIG. 12 provides a schematic view of a computing system for implementing one or more aspects of the present disclosure according to example embodiments of the present disclosure.

FIG. 12 provides a block diagram of an example computing system 500 that can be used to implement methods and systems described herein according to example embodiments of the present disclosure. Computing system 500 is one example of a suitable computing system for implementing the computing elements described herein. EECs 118, ground computing device 156, onboard computing devices 148, computing devices of the WCU 128, and other computing devices noted herein can be constructed and operate in a similar manner as computing system 500.

As shown in FIG. 12, the computing system 500 can include one or more computing device(s) 502. The one or more computing device(s) 502 can include one or more processor(s) 504 and one or more memory device(s) 506. The one or more processor(s) 504 can include any suitable processing device, such as a microprocessor, microcontroller, integrated circuit, logic device, or other suitable processing device. The one or more memory device(s) 506 can include one or more computer-readable media, including, but not limited to, non-transitory computer-readable media, RAM, ROM, hard drives, flash drives, and other memory devices, such as buffer 134.

The one or more memory device(s) 506 can store information accessible by the one or more processor(s) 504, including computer-readable instructions 508 that can be executed by the one or more processor(s) 504. The instructions 508 can be any set of instructions that when executed by the one or more processor(s) 504, cause the one or more processor(s) 504 to perform operations. The instructions 508 can be software written in any suitable programming language or can be implemented in hardware. In some embodiments, the instructions 508 can be executed by the one or more processor(s) 504 to cause the one or more processor(s) 504 to perform operations.

The memory device(s) 506 can further store data 510 that can be accessed by the processors 504. For example, the data 510 can include sensor data such as engine parameters, model data, logic data, etc., as described herein. The data 510 can include one or more table(s), function(s), algorithm(s), model(s), equation(s), etc. according to example embodiments of the present disclosure.

The one or more computing device(s) 502 can also include a communication interface 512 used to communicate, for example, with the other components of system. The communication interface 512 can include any suitable components for interfacing with one or more network(s), including for example, transmitters, receivers, ports, controllers, antennas, or other suitable components.

Figure 13:
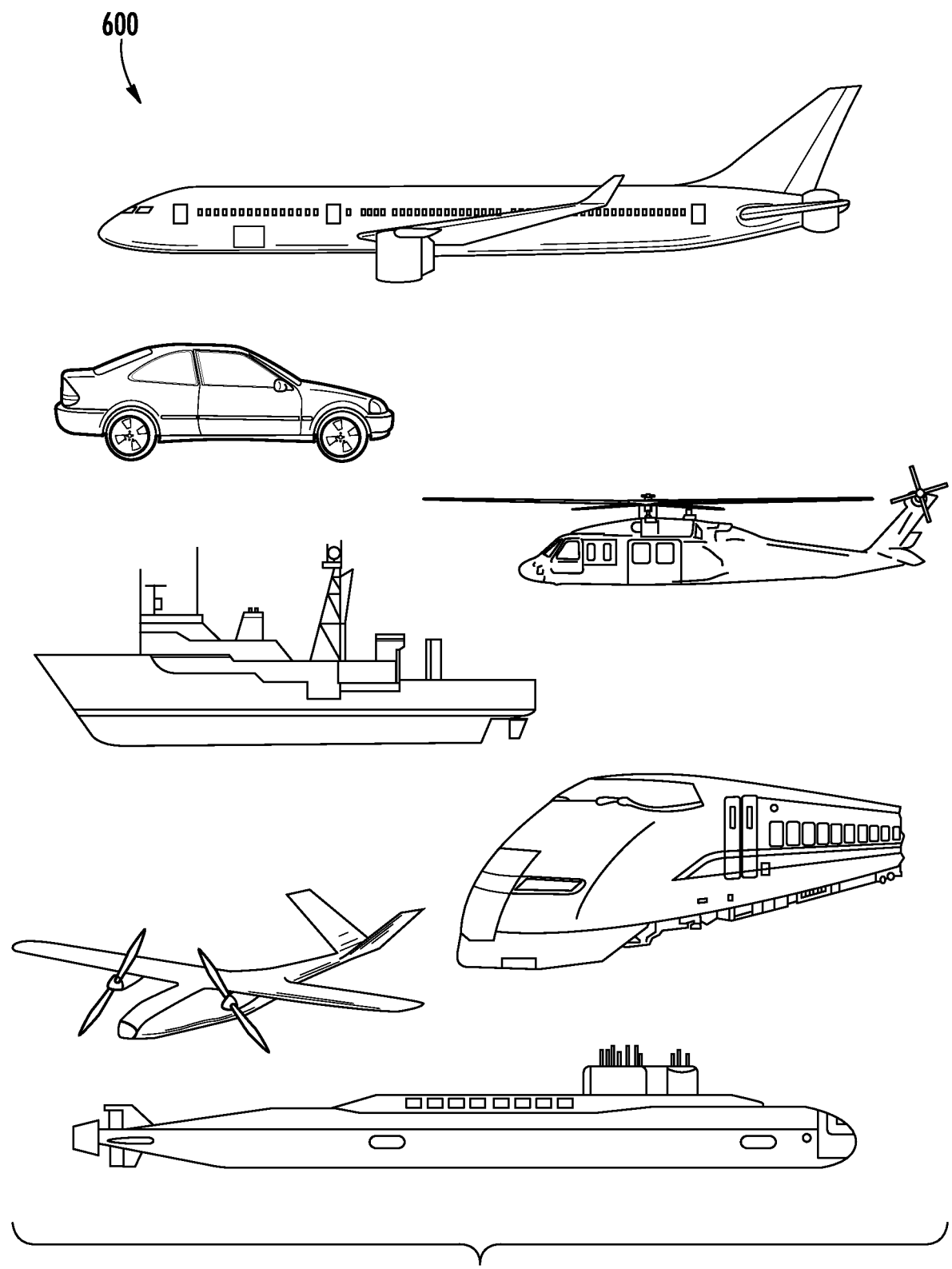
FIG. 13 provides example vehicles according to example embodiments of the present disclosure.

FIG. 13 provides example vehicles 600 according to example embodiments of the present disclosure. The systems and methods of the present disclosure can be implemented on an aircraft, helicopter, automobile, boat, submarine, train, unmanned aerial vehicle or drone and/or on any other suitable vehicle. While the present disclosure is described herein with reference to an aircraft implementation, this is intended only to serve as an example and not to be limiting. One of ordinary skill in the art would understand that the systems and methods of the present disclosure can be implemented on other vehicles without deviating from the scope of the present disclosure.

Further, although the inventive aspects of the present disclosure have been discussed with reference to the binary data file relating to CEOD, it will be appreciated that the inventive aspects of the present disclosure are not limited to EEC-generated data. Rather, the binary data file can be generated by any suitable computing device that originates data on the serial data bus.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method, comprising:
    receiving, by a remote station, bus data comprised of a transmission frame transmitted over a databus to a bus recorder, the transmission frame packed with one or more transmission payloads, wherein the one or more transmission payloads are packed into the transmission frame by:
        generating, by one or more computing devices, a data file;
        storing, by the one or more computing devices, the data file in a data storage device;
        determining, by the one or more computing devices, an available bandwidth of the transmission frame, the transmission frame including a plurality of available slots for data to be transmitted by the databus;
        retrieving, by the one or more computing devices, a selectively-sized portion of the data file from the data storage device based at least in part on the available bandwidth of the transmission frame;
        dividing, by the one or more computing devices, the selectively-sized portion of the data file into the one or more transmission payloads; and
        allocating, by the one or more computing devices, the one or more transmission payloads to selected ones of the plurality of available slots, and
    wherein the databus is configured to transmit the transmission frame, which is packed with the one or more transmission payloads allocated to selected ones of the plurality of available slots, to the bus recorder and the bus recorder is configured to receive the transmission frame.

2. The method of claim 1, wherein the databus and the bus recorder are both positioned onboard a vehicle and the remote station is remote from the vehicle.

3. The method of claim 1, wherein the remote station is a ground station.

4. The method of claim 1, wherein the transmission frame is one of a plurality of transmission frames of the bus data, and wherein the plurality of transmission frames are packed with one or more transmission payloads by:
    determining, an available bandwidth of a respective one of the plurality of transmission frames, each respective one of the plurality of transmission frames including a plurality of available slots for data to be transmitted by the databus;
    retrieving a selectively-sized portion of the data file based at least in part on the available bandwidth of the respective one of the plurality of transmission frames;
    dividing the selectively-sized portion of the data file into a plurality of transmission payloads;
    allocating the plurality of transmission payloads to selected ones of the plurality of available slots of the respective one of the plurality of transmission frames;
    wherein the databus is configured to transmit the plurality of transmission payloads corresponding to the respective one of the plurality of transmission frames to the bus recorder; and
    wherein the bus recorder is configured to receive the plurality of transmission payloads corresponding to the respective one of the plurality of transmission frames.

5. The method of claim 1, further comprising:
    generating, by the remote station, a reconstructed data file based at least in part on the one or more transmission payloads.

6. The method of claim 5, wherein allocating the one or more transmission payloads to selected ones of the plurality of available slots comprises:
    generating, by the one or more computing devices, a plurality of data words, wherein respective ones of the plurality of data words comprise a respective one of the one or more transmission payloads and a label associating the respective one of the one or more transmission payloads with the data file; and
    wherein generating, by the remote station, the reconstructed data file comprises:
        extracting, by the remote station, the one or more transmission payloads from the respective ones of the plurality of data words and combining the transmission payloads extracted from the respective ones of the plurality of data words with one another.

7. The method of claim 5, further comprising:
    decoding, by the remote station, the reconstructed data file to render a human-readable file.

8. The method of claim 1, wherein the transmission frame has one or more non-available slots that have a data word allocated thereto.

9. The method of claim 1, wherein in packing the one or more transmission payloads into the transmission frame, the one or more computing devices generate a plurality of data words that each include a respective one of the one or more transmission payloads and a label associating the respective one of the one or more transmission payloads with the data file, and
    wherein the databus is configured to transmit the plurality of data words to the bus recorder and the bus recorder is configured to receive the plurality of data words.

10. The method of claim 9, wherein the one or more computing devices are further configured to allocate the label to additional selected ones of the plurality of available slots.

11. The method of claim 10, wherein respective ones of the plurality of data words include a counter payload indicating a transmission payload count.

12. A remote station, comprising:
    one or more processors and one or more memory devices, the one or more processors configured to:
        receive bus data comprised of a transmission frame transmitted over a databus to a bus recorder, the transmission frame packed with one or more transmission payloads, wherein the one or more computing devices of the vehicle pack the one or more transmission payloads into the transmission frame by:

generating, by one or more computing devices, a data file;

storing, by the one or more computing devices, the data file in a data storage device;

determining, by the one or more computing devices, an available bandwidth of the transmission frame, the transmission frame including a plurality of available slots for data to be transmitted by the databus;

retrieving, by the one or more computing devices, a selectively-sized portion of the data file from the data storage device based at least in part on the available bandwidth of the transmission frame;

dividing, by the one or more computing devices, the selectively-sized portion of the data file into the one or more transmission payloads; and allocating, by the one or more computing devices, the one or more transmission payloads to selected ones of the plurality of available slots, and wherein the databus is configured to transmit the transmission frame, which is packed with the one or more transmission payloads allocated to selected ones of the plurality of available slots, to the bus recorder and the bus recorder is configured to receive the transmission frame.

13. The remote station of claim 12, wherein the remote station is a ground station.

14. The remote station of claim 12, wherein the remote station is onboard a vehicle.

15. The remote station of claim 12, wherein the databus is a serial databus.

16. The remote station of claim 12, wherein the one or more processors of the remote station are further configured to:

generate a reconstructed data file based at least in part on the one or more transmission payloads.

17. The remote station of claim 16, wherein allocating the one or more transmission payloads to selected ones of the plurality of available slots comprises:

generating, by the one or more computing devices, a plurality of data words, wherein respective ones of the plurality of data words comprise a respective one of the one or more transmission payloads and a label associating the respective one of the one or more transmission payloads with the data file, and wherein generating, by the one or more processors of the remote station, the reconstructed data file comprises extracting, by the one or more processors, the one or more transmission payloads from the respective ones of the plurality of data words and combining the transmission payloads extracted from the respective ones of the plurality of data words with one another.

18. The remote station of claim 16, wherein the one or more processors of the remote station are further configured to:

decode the reconstructed data file to render a human-readable file.

19. The remote station of claim 12, wherein the transmission frame has one or more non-available slots that have a data word allocated thereto.

20. A non-transitory computer readable medium comprising computer-executable instructions, which, when executed by one or more processors of a remote station, cause the one or more processors to:

receive bus data comprised of a transmission frame transmitted over a databus to a bus recorder, the transmission frame packed with one or more transmission payloads, wherein the one or more transmission payloads are packed into the transmission frame by:

generating, by one or more computing devices, a data file;

storing, by the one or more computing devices, the data file in a data storage device;

determining, by the one or more computing devices, an available bandwidth of the transmission frame, the transmission frame including a plurality of available slots for data to be transmitted by the databus;

retrieving, by the one or more computing devices, a selectively-sized portion of the data file from the data storage device based at least in part on the available bandwidth of the transmission frame;

dividing, by the one or more computing devices, the selectively-sized portion of the data file into the one or more transmission payloads; and allocating, by the one or more computing devices, the one or more transmission payloads to selected ones of the plurality of available slots, and wherein the databus is configured to transmit the transmission frame, which is packed with the one or more transmission payloads allocated to selected ones of the plurality of available slots, to the bus recorder and the bus recorder is configured to receive the transmission frame.

* * * * *